United States Patent
Potter et al.

(10) Patent No.: US 10,825,326 B1
(45) Date of Patent: **\*Nov. 3, 2020**

(54) METHODS OF FACILITATING EMERGENCY ASSISTANCE

(71) Applicant: State Farm Mutual Automobile Insurance Company, Bloomington, IL (US)

(72) Inventors: Thomas Michael Potter, Normal, IL (US); Mark E. Clauss, Bloomington, IL (US); Dustin Ryan Carter, Normal, IL (US); Douglas Albert Graff, Mountain View, MO (US); Megan Michal Baumann, Bloomington, IL (US); Atlanta Bonnom, Bloomington, IL (US); Craig Cope, Bloomington, IL (US); Jennifer Luella Lawyer, Bloomington, IL (US); Curtis Simpson, Bloomington, IL (US); Nathan W. Baumann, Bloomington, IL (US)

(73) Assignee: State Farm Mutual Automobile Insurance Company, Bloomington, IL (US)

(\*) Notice: Subject to any disclaimer, the term of this patent is extended or adjusted under 35 U.S.C. 154(b) by 0 days.

This patent is subject to a terminal disclaimer.

(21) Appl. No.: 16/178,838

(22) Filed: Nov. 2, 2018

Related U.S. Application Data

(63) Continuation of application No. 15/676,470, filed on Aug. 14, 2017, now Pat. No. 10,163,327, which is a
(Continued)

(51) Int. Cl.
*G08B 25/00* (2006.01)
*G08B 21/02* (2006.01)
(Continued)

(52) U.S. Cl.
CPC ............. *G08B 25/00* (2013.01); *G06Q 40/08* (2013.01); *G08B 21/02* (2013.01); *B60W 2030/082* (2013.01)

(58) Field of Classification Search
CPC ....... G06Q 40/08; G06Q 10/00; H04W 88/02; H04W 4/02; H04W 4/22; H04W 4/043;
(Continued)

(56) References Cited

U.S. PATENT DOCUMENTS

| 4,218,763 A | 8/1980 | Kelley et al. |
| 4,386,376 A | 5/1983 | Takimoto et al. |

(Continued)

FOREIGN PATENT DOCUMENTS

| DE | 102010001006 A1 | 7/2011 |
| DE | 102015208358 A1 | 11/2015 |

(Continued)

OTHER PUBLICATIONS

U.S. Appl. No. 13/844,090, Notice of Allowance, dated Jul. 8, 2014.
(Continued)

*Primary Examiner* — Hoi C Lau
(74) *Attorney, Agent, or Firm* — Faegre Drinker Biddle & Reath

(57) ABSTRACT

In system and methods for loss mitigation, accident data associated with a vehicle accident involving a driver may be collected. The accident data may be analyzed, and a likely severity of the vehicle accident may be determined based upon the analysis of the accident data. A communication related to emergency assistance or an emergency assistance recommendation may be generated based upon the determined likely severity of the vehicle accident, and transmitted, via wireless communication, from one or more remote servers to a mobile device associated with the driver. A wireless communication from the driver indicating approval
(Continued)

or modification of the emergency assistance or emergency assistance recommendation may be received. A third party may be notified, via a communication sent from the remote server(s), of requested emergency assistance as approved or modified by the driver. An estimated insurance claim may also be generated based upon vehicle accident likely severity.

20 Claims, 5 Drawing Sheets

Related U.S. Application Data continuation of application No. 14/798,757, filed on Jul. 14, 2015, now Pat. No. 9,786,154.

(60) Provisional application No. 62/145,234, filed on Apr. 9, 2015, provisional application No. 62/145,027, filed on Apr. 9, 2015, provisional application No. 62/145,228, filed on Apr. 9, 2015, provisional application No. 62/145,029, filed on Apr. 9, 2015, provisional application No. 62/145,232, filed on Apr. 9, 2015, provisional application No. 62/145,033, filed on Apr. 9, 2015, provisional application No. 62/145,024, filed on Apr. 9, 2015, provisional application No. 62/145,028, filed on Apr. 9, 2015, provisional application No. 62/145,145, filed on Apr. 9, 2015, provisional application No. 62/145,032, filed on Apr. 9, 2015, provisional application No. 62/145,022, filed on Apr. 9, 2015, provisional application No. 62/040,735, filed on Aug. 22, 2014, provisional application No. 62/027,021, filed on Jul. 21, 2014.

(51) Int. Cl.
G06Q 40/08 (2012.01)
B60W 30/08 (2012.01)

(58) Field of Classification Search
CPC .. H04M 3/487; G06F 19/3418; G07C 5/0816; G08B 21/02; B60W 40/09
USPC ..... 340/426.12, 539.12, 439, 436, 435, 438; 705/4, 400, 325, 26.7; 455/557, 404.1, 455/456.2
See application file for complete search history.

(56) References Cited

U.S. PATENT DOCUMENTS

| | | |
|---|---|---|
| 4,565,997 A | 1/1986 | Seko et al. |
| 4,833,469 A | 5/1989 | David |
| 5,214,582 A | 5/1993 | Gray |
| 5,220,919 A | 6/1993 | Phillips et al. |
| 5,270,708 A | 12/1993 | Kamishima |
| 5,363,298 A | 11/1994 | Survanshi et al. |
| 5,367,456 A | 11/1994 | Summerville et al. |
| 5,368,484 A | 11/1994 | Copperman et al. |
| 5,436,839 A | 7/1995 | Dausch et al. |
| 5,453,939 A | 9/1995 | Hoffman et al. |
| 5,488,353 A | 1/1996 | Kawakami et al. |
| 5,499,182 A | 3/1996 | Ousborne |
| 5,515,026 A | 5/1996 | Ewert |
| 5,574,641 A | 11/1996 | Kawakami et al. |
| 5,626,362 A | 5/1997 | Mottola |
| 5,689,241 A | 11/1997 | Clarke et al. |
| 5,797,134 A | 8/1998 | McMillan |
| 5,825,283 A | 10/1998 | Camhi |
| 5,835,008 A | 11/1998 | Colemere, Jr. |
| 5,978,720 A | 11/1999 | Hieronymus |
| 5,983,161 A | 11/1999 | Lemelson et al. |
| 6,031,354 A | 2/2000 | Wiley et al. |
| 6,064,970 A | 5/2000 | McMillan et al. |
| 6,067,488 A | 5/2000 | Tano |
| 6,141,611 A | 10/2000 | Mackey et al. |
| 6,151,539 A | 11/2000 | Bergholz et al. |
| 6,215,200 B1 | 4/2001 | Genzel |
| 6,246,933 B1 | 6/2001 | Bague |
| 6,253,129 B1 | 6/2001 | Jenkins et al. |
| 6,271,745 B1 | 8/2001 | Anzai et al. |
| 6,285,931 B1 | 9/2001 | Hattori et al. |
| 6,298,290 B1 | 10/2001 | Abe et al. |
| 6,313,749 B1 | 11/2001 | Horne et al. |
| 6,323,761 B1 | 11/2001 | Son |
| 6,353,396 B1 | 3/2002 | Atlas |
| 6,400,835 B1 | 6/2002 | Lemelson et al. |
| 6,473,000 B1 | 10/2002 | Secreet et al. |
| 6,477,117 B1 | 11/2002 | Narayanaswami et al. |
| 6,553,354 B1 | 4/2003 | Hausner et al. |
| 6,556,905 B1 | 4/2003 | Mittelsteadt et al. |
| 6,570,609 B1 | 5/2003 | Heien |
| 6,579,233 B2 | 6/2003 | Hursh |
| 6,661,345 B1 | 12/2003 | Bevan et al. |
| 6,701,234 B1 | 3/2004 | Vogelsang |
| 6,704,434 B1 | 3/2004 | Sakoh et al. |
| 6,727,800 B1 | 4/2004 | Dutu |
| 6,765,495 B1 | 7/2004 | Dunning et al. |
| 6,795,759 B2 | 9/2004 | Doyle |
| 6,832,141 B2 | 12/2004 | Skeen et al. |
| 6,889,137 B1 | 5/2005 | Rychlak |
| 6,909,407 B1 | 6/2005 | Schradi |
| 6,909,947 B2 | 6/2005 | Douros et al. |
| 6,925,425 B2 | 8/2005 | Remboski et al. |
| 6,931,309 B2 | 8/2005 | Phelan et al. |
| 6,934,365 B2 | 8/2005 | Suganuma et al. |
| 6,944,536 B2 | 9/2005 | Singleton |
| 6,956,470 B1 | 10/2005 | Heise |
| 6,974,414 B2 | 12/2005 | Victor |
| 6,983,313 B1 | 1/2006 | Korkea-Aho |
| 6,989,737 B2 | 1/2006 | Yasui |
| 7,027,621 B1 | 4/2006 | Prokoski |
| 7,054,723 B2 | 5/2006 | Seto et al. |
| 7,056,265 B1 | 6/2006 | Shea |
| 7,102,496 B1 | 9/2006 | Ernst et al. |
| 7,138,922 B2 | 11/2006 | Strumolo et al. |
| 7,149,533 B2 | 12/2006 | Laird et al. |
| 7,200,207 B2 | 4/2007 | Meer |
| 7,253,724 B2 | 8/2007 | Prakah-Asante et al. |
| 7,254,482 B2 | 8/2007 | Kawasaki et al. |
| 7,266,532 B2 | 9/2007 | Sutton et al. |
| 7,290,275 B2 | 10/2007 | Baudoin et al. |
| 7,302,344 B2 | 11/2007 | Olney et al. |
| 7,315,233 B2 | 1/2008 | Yuhara |
| 7,330,124 B2 | 2/2008 | Ota |
| 7,348,882 B2 | 3/2008 | Adamczyk et al. |
| 7,349,860 B1 | 3/2008 | Wallach et al. |
| 7,356,392 B2 | 4/2008 | Hubbard et al. |
| 7,386,376 B2 | 6/2008 | Basir et al. |
| 7,391,784 B1 | 6/2008 | Renkel |
| 7,424,414 B2 | 9/2008 | Craft |
| 7,480,501 B2 | 1/2009 | Petite |
| 7,499,774 B2 | 3/2009 | Barrett et al. |
| 7,565,230 B2 | 7/2009 | Gardner et al. |
| 7,596,242 B2 | 9/2009 | Breed et al. |
| 7,609,150 B2 | 10/2009 | Wheatley et al. |
| 7,639,148 B2 | 12/2009 | Victor |
| 7,676,062 B2 | 3/2010 | Breed et al. |
| 7,692,552 B2 | 4/2010 | Harrington et al. |
| 7,719,431 B2 | 5/2010 | Bolourchi |
| 7,783,426 B2 | 8/2010 | Kato et al. |
| 7,783,505 B2 | 8/2010 | Roschelle et al. |
| 7,791,503 B2 | 9/2010 | Breed et al. |
| 7,792,328 B2 | 9/2010 | Albertson et al. |
| 7,797,107 B2 | 9/2010 | Shiller |
| 7,812,712 B2 | 10/2010 | White et al. |
| 7,813,888 B2 | 10/2010 | Vian et al. |
| 7,835,834 B2 | 11/2010 | Smith et al. |
| 7,865,378 B2 | 1/2011 | Gay |
| 7,870,010 B2 | 1/2011 | Joao |

(56) References Cited

U.S. PATENT DOCUMENTS

| | | |
|---|---|---|
| 7,877,275 B2 | 1/2011 | Ball |
| 7,881,914 B2 | 2/2011 | Trotta et al. |
| 7,881,951 B2 | 2/2011 | Roschelle et al. |
| 7,890,355 B2 | 2/2011 | Gay et al. |
| 7,904,219 B1 | 3/2011 | Lowrey et al. |
| 7,912,740 B2 | 3/2011 | Vahidi |
| 7,973,674 B2 | 7/2011 | Bell et al. |
| 7,979,172 B2 | 7/2011 | Breed |
| 7,979,173 B2 | 7/2011 | Breed |
| 7,983,802 B2 | 7/2011 | Breed |
| 7,987,103 B2 | 7/2011 | Gay et al. |
| 7,991,629 B2 | 8/2011 | Gay et al. |
| 8,005,467 B2 | 8/2011 | Gerlach |
| 8,009,051 B2 | 8/2011 | Omi |
| 8,010,283 B2 | 8/2011 | Yoshida et al. |
| 8,016,595 B2 | 9/2011 | Aoki et al. |
| 8,027,853 B1 | 9/2011 | Kazenas |
| 8,035,508 B2 | 10/2011 | Breed |
| 8,040,247 B2 | 10/2011 | Gunaratne |
| 8,068,983 B2 | 11/2011 | Vian et al. |
| 8,078,334 B2 | 12/2011 | Goodrich |
| 8,090,598 B2 | 1/2012 | Bauer et al. |
| 8,095,394 B2 | 1/2012 | Nowak et al. |
| 8,102,901 B2 | 1/2012 | Aissi et al. |
| 8,106,769 B1 | 1/2012 | Maroney et al. |
| 8,108,655 B2 | 1/2012 | Abernathy et al. |
| 8,117,049 B2 | 2/2012 | Berkobin et al. |
| 8,123,686 B2 | 2/2012 | Fennell et al. |
| 8,140,249 B2 | 3/2012 | Hessling et al. |
| 8,140,358 B1 | 3/2012 | Ling |
| 8,140,359 B2 | 3/2012 | Daniel |
| 8,180,522 B2 | 5/2012 | Tuff |
| 8,180,655 B1 | 5/2012 | Hopkins, III |
| 8,185,380 B2 | 5/2012 | Kameyama |
| 8,188,887 B2 | 5/2012 | Catten et al. |
| 8,190,323 B2 | 5/2012 | Maeda et al. |
| 8,204,766 B2 | 6/2012 | Bush |
| 8,255,144 B2 | 8/2012 | Breed et al. |
| 8,255,243 B2 | 8/2012 | Raines et al. |
| 8,255,244 B2 | 8/2012 | Raines et al. |
| 8,260,489 B2 | 9/2012 | Nielsen et al. |
| 8,260,639 B1 | 9/2012 | Medina, III |
| 8,265,861 B2 | 9/2012 | Ikeda et al. |
| 8,275,417 B2 | 9/2012 | Flynn |
| 8,280,752 B1 | 10/2012 | Cripe et al. |
| 8,311,858 B2 | 11/2012 | Everett et al. |
| 8,314,708 B2 | 11/2012 | Gunderson et al. |
| 8,332,242 B1 | 12/2012 | Medina, III |
| 8,340,893 B2 | 12/2012 | Yamaguchi et al. |
| 8,340,902 B1 | 12/2012 | Chiang |
| 8,344,849 B2 | 1/2013 | Larsson et al. |
| 8,352,118 B1 | 1/2013 | Mittelsteadt et al. |
| 8,355,837 B2 | 1/2013 | Avery et al. |
| 8,364,391 B2 | 1/2013 | Nagase et al. |
| 8,384,534 B2 | 2/2013 | James et al. |
| 8,386,168 B2 | 2/2013 | Hao |
| 8,423,239 B2 | 4/2013 | Blumer et al. |
| 8,437,966 B2 | 5/2013 | Connolly et al. |
| 8,447,231 B2 | 5/2013 | Bai et al. |
| 8,451,105 B2 | 5/2013 | McNay |
| 8,457,880 B1 | 6/2013 | Malalur et al. |
| 8,473,143 B2 | 6/2013 | Stark et al. |
| 8,487,775 B2 | 7/2013 | Victor et al. |
| 8,510,196 B1 | 8/2013 | Brandmaier |
| 8,520,695 B1 | 8/2013 | Rubin et al. |
| 8,554,468 B1 | 10/2013 | Bullock |
| 8,554,587 B1 | 10/2013 | Nowak et al. |
| 8,566,126 B1 | 10/2013 | Hopkins, III |
| 8,595,034 B2 | 11/2013 | Bauer et al. |
| 8,595,037 B1 | 11/2013 | Hyde et al. |
| 8,605,947 B2 | 12/2013 | Zhang et al. |
| 8,606,512 B1 | 12/2013 | Bogovich |
| 8,618,922 B2 | 12/2013 | Debouk et al. |
| 8,634,980 B1 | 1/2014 | Urmson et al. |
| 8,645,014 B1 | 2/2014 | Kozlowski |
| 8,645,029 B2 | 2/2014 | Kim et al. |
| 8,698,639 B2 | 4/2014 | Fung et al. |
| 8,700,251 B1 | 4/2014 | Zhu et al. |
| 8,712,893 B1 | 4/2014 | Brandmaier |
| 8,725,311 B1 | 5/2014 | Breed |
| 8,725,472 B2 | 5/2014 | Hagelin et al. |
| 8,731,977 B1 | 5/2014 | Hardin et al. |
| 8,738,523 B1 | 5/2014 | Sanchez |
| 8,742,936 B2 | 6/2014 | Galley et al. |
| 8,781,442 B1 | 7/2014 | Link, II |
| 8,781,669 B1 | 7/2014 | Teller et al. |
| 8,788,299 B1 | 7/2014 | Medina, III |
| 8,799,034 B1 | 8/2014 | Brandmaier et al. |
| 8,816,836 B2 | 8/2014 | Lee et al. |
| 8,818,608 B2 | 8/2014 | Cullinane et al. |
| 8,825,258 B2 | 9/2014 | Cullinane et al. |
| 8,849,558 B2 | 9/2014 | Morotomi et al. |
| 8,874,301 B1 | 10/2014 | Rao et al. |
| 8,874,305 B2 | 10/2014 | Dolgov et al. |
| 8,876,535 B2 | 11/2014 | Fields |
| 8,880,291 B1 | 11/2014 | Hampiholi |
| 8,892,271 B2 | 11/2014 | Breed |
| 8,902,054 B2 | 12/2014 | Morris |
| 8,909,428 B1 | 12/2014 | Lombrozo |
| 8,917,182 B2 | 12/2014 | Chang et al. |
| 8,935,036 B1 | 1/2015 | Christensen et al. |
| 8,954,217 B1 | 2/2015 | Montemerlo et al. |
| 8,954,226 B1 | 2/2015 | Binion et al. |
| 8,965,677 B2 | 2/2015 | Breed et al. |
| 8,989,959 B2 | 3/2015 | Plante et al. |
| 8,996,228 B1 | 3/2015 | Ferguson et al. |
| 8,996,240 B2 | 3/2015 | Plante |
| 9,008,952 B2 | 4/2015 | Caskey et al. |
| 9,019,092 B1 | 4/2015 | Brandmaier et al. |
| 9,026,266 B2 | 5/2015 | Aaron et al. |
| 9,049,584 B2 | 6/2015 | Hatton |
| 9,053,588 B1 * | 6/2015 | Briggs .................. G07C 5/006 |
| 9,055,407 B1 | 6/2015 | Riemer et al. |
| 9,056,395 B1 | 6/2015 | Ferguson et al. |
| 9,056,616 B1 | 6/2015 | Fields |
| 9,063,543 B2 | 6/2015 | An et al. |
| 9,070,243 B1 | 6/2015 | Kozlowski |
| 9,075,413 B2 | 7/2015 | Cullinane et al. |
| 9,079,587 B1 | 7/2015 | Rupp et al. |
| 9,081,650 B1 | 7/2015 | Brinkmann et al. |
| 9,098,080 B2 | 8/2015 | Norris et al. |
| 9,135,803 B1 | 9/2015 | Fields |
| 9,141,582 B1 | 9/2015 | Brinkmann et al. |
| 9,141,995 B1 | 9/2015 | Brinkmann |
| 9,141,996 B2 | 9/2015 | Christensen et al. |
| 9,144,389 B2 | 9/2015 | Srinivasan et al. |
| 9,147,219 B2 | 9/2015 | Binion et al. |
| 9,147,353 B1 | 9/2015 | Slusar |
| 9,151,692 B2 | 10/2015 | Breed |
| 9,164,507 B2 | 10/2015 | Cheatham, III et al. |
| 9,177,475 B2 | 11/2015 | Sellschopp |
| 9,180,888 B1 | 11/2015 | Fields |
| 9,182,942 B2 | 11/2015 | Kelly et al. |
| 9,188,985 B1 | 11/2015 | Hobbs et al. |
| 9,194,168 B1 | 11/2015 | Lu et al. |
| 9,205,805 B2 | 12/2015 | Cudak et al. |
| 9,205,842 B1 | 12/2015 | Fields et al. |
| 9,221,396 B1 | 12/2015 | Zhu et al. |
| 9,224,293 B2 | 12/2015 | Taylor |
| 9,229,905 B1 | 1/2016 | Penilla et al. |
| 9,230,441 B2 | 1/2016 | Sung et al. |
| 9,235,211 B2 | 1/2016 | Davidsson et al. |
| 9,262,787 B2 | 2/2016 | Binion et al. |
| 9,274,525 B1 | 3/2016 | Ferguson et al. |
| 9,275,417 B2 | 3/2016 | Binion et al. |
| 9,275,552 B1 | 3/2016 | Fields et al. |
| 9,279,697 B2 | 3/2016 | Fields |
| 9,282,430 B1 * | 3/2016 | Brandmaier ............ H04W 4/90 |
| 9,282,447 B2 | 3/2016 | Gianakis |
| 9,283,847 B2 | 3/2016 | Riley et al. |
| 9,299,108 B2 | 3/2016 | Diana et al. |
| 9,308,891 B2 | 4/2016 | Cudak et al. |
| 9,317,983 B2 | 4/2016 | Ricci |
| 9,342,074 B2 | 5/2016 | Dolgov et al. |

(56) References Cited

U.S. PATENT DOCUMENTS

| | | |
|---|---|---|
| 9,342,993 B1 | 5/2016 | Fields et al. |
| 9,352,709 B2 | 5/2016 | Brenneis et al. |
| 9,352,752 B2 | 5/2016 | Cullinane et al. |
| 9,355,423 B1 | 5/2016 | Slusar |
| 9,361,599 B1 | 6/2016 | Biemer et al. |
| 9,361,650 B2 | 6/2016 | Binion et al. |
| 9,371,072 B1 | 6/2016 | Sisbot |
| 9,373,203 B1 | 6/2016 | Fields |
| 9,376,090 B2 | 6/2016 | Gennermann |
| 9,377,315 B2 | 6/2016 | Grover et al. |
| 9,381,916 B1 | 7/2016 | Zhu et al. |
| 9,384,491 B1 | 7/2016 | Briggs |
| 9,384,674 B2 | 7/2016 | Nepomuceno |
| 9,390,451 B1 | 7/2016 | Slusar |
| 9,390,452 B1 | 7/2016 | Biemer et al. |
| 9,390,567 B2 | 7/2016 | Kim et al. |
| 9,398,421 B2 | 7/2016 | Guba et al. |
| 9,399,445 B2 | 7/2016 | Abou et al. |
| 9,421,972 B2 | 8/2016 | Davidsson et al. |
| 9,429,943 B2 | 8/2016 | Wilson et al. |
| 9,430,944 B2 | 8/2016 | Grimm et al. |
| 9,440,657 B1 | 9/2016 | Fields et al. |
| 9,443,152 B2 | 9/2016 | Atsmon et al. |
| 9,443,436 B2 | 9/2016 | Scheidt |
| 9,454,786 B1 | 9/2016 | Srey et al. |
| 9,457,754 B1 | 10/2016 | Christensen |
| 9,466,214 B2 | 10/2016 | Fuehrer |
| 9,475,496 B2 | 10/2016 | Attard et al. |
| 9,477,990 B1 | 10/2016 | Binion et al. |
| 9,478,150 B1 | 10/2016 | Fields et al. |
| 9,489,635 B1 | 11/2016 | Zhu |
| 9,505,494 B1 | 11/2016 | Marlow |
| 9,511,765 B2 | 12/2016 | Obradovich |
| 9,511,767 B1 | 12/2016 | Okumura et al. |
| 9,511,779 B2 | 12/2016 | Cullinane et al. |
| 9,517,771 B2 | 12/2016 | Attard et al. |
| 9,524,648 B1 | 12/2016 | Gopalakrishnan et al. |
| 9,529,361 B2 | 12/2016 | You et al. |
| 9,530,333 B1 | 12/2016 | Fields et al. |
| 9,542,846 B2 | 1/2017 | Zeng et al. |
| 9,566,959 B2 | 2/2017 | Breuer et al. |
| 9,567,007 B2 | 2/2017 | Cudak et al. |
| 9,583,017 B2 | 2/2017 | Nepomuceno |
| 9,586,591 B1 | 3/2017 | Fields |
| 9,587,952 B1 | 3/2017 | Slusar |
| 9,594,373 B2 | 3/2017 | Solyom et al. |
| 9,601,027 B2 | 3/2017 | Nepomuceno |
| 9,604,652 B2 | 3/2017 | Strauss |
| 9,632,502 B1 | 4/2017 | Levinson et al. |
| 9,633,318 B2 | 4/2017 | Plante |
| 9,646,428 B1 | 5/2017 | Konrardy et al. |
| 9,646,433 B1 | 5/2017 | Sanchez |
| 9,650,051 B2 | 5/2017 | Hoye et al. |
| 9,656,606 B1 | 5/2017 | Vose |
| 9,663,112 B2 | 5/2017 | Abou-Nasr et al. |
| 9,665,101 B1 | 5/2017 | Templeton |
| 9,679,487 B1 | 6/2017 | Hayward |
| 9,697,733 B1 | 7/2017 | Penilla et al. |
| 9,712,549 B2 | 7/2017 | Almurayh |
| 9,715,711 B1 | 7/2017 | Konrardy et al. |
| 9,720,419 B2 | 8/2017 | O'Neill et al. |
| 9,725,036 B1 | 8/2017 | Tarte |
| 9,727,920 B1 | 8/2017 | Healy et al. |
| 9,753,390 B2 | 9/2017 | Kabai |
| 9,754,325 B1 | 9/2017 | Konrardy et al. |
| 9,754,424 B2 | 9/2017 | Ling et al. |
| 9,754,490 B2 | 9/2017 | Kentley et al. |
| 9,761,139 B2 | 9/2017 | Acker et al. |
| 9,766,625 B2 | 9/2017 | Boroditsky et al. |
| 9,767,516 B1 | 9/2017 | Konrardy et al. |
| 9,773,281 B1 * | 9/2017 | Hanson .................. G06Q 40/08 |
| 9,783,159 B1 | 10/2017 | Potter |
| 9,786,154 B1 * | 10/2017 | Potter .................. G08B 21/02 |
| 9,792,656 B1 | 10/2017 | Konrardy et al. |
| 9,797,881 B2 | 10/2017 | Biondo et al. |
| 9,805,423 B1 | 10/2017 | Konrardy et al. |
| 9,805,601 B1 | 10/2017 | Fields et al. |
| 9,816,827 B1 | 11/2017 | Slusar |
| 9,830,662 B1 | 11/2017 | Baker et al. |
| 9,847,033 B1 | 12/2017 | Carmack et al. |
| 9,852,475 B1 | 12/2017 | Konrardy et al. |
| 9,858,621 B1 | 1/2018 | Konrardy et al. |
| 9,868,394 B1 | 1/2018 | Fields et al. |
| 9,870,649 B1 | 1/2018 | Fields et al. |
| 9,878,617 B2 | 1/2018 | Mochizuki |
| 9,884,611 B2 | 2/2018 | Abou et al. |
| 9,896,062 B1 | 2/2018 | Potter |
| 9,904,928 B1 | 2/2018 | Leise |
| 9,908,530 B1 | 3/2018 | Fields et al. |
| 9,934,667 B1 | 4/2018 | Fields et al. |
| 9,939,279 B2 | 4/2018 | Pan et al. |
| 9,940,676 B1 | 4/2018 | Biemer |
| 9,940,834 B1 | 4/2018 | Konrardy et al. |
| 9,944,282 B1 | 4/2018 | Fields et al. |
| 9,946,531 B1 | 4/2018 | Fields et al. |
| 9,948,477 B2 | 4/2018 | Marten |
| 9,972,054 B1 | 5/2018 | Konrardy et al. |
| 9,972,184 B2 | 5/2018 | Freeck et al. |
| 9,986,404 B2 | 5/2018 | Mehta et al. |
| 10,007,263 B1 | 6/2018 | Fields et al. |
| 10,013,697 B1 | 7/2018 | Cote et al. |
| 10,017,153 B1 | 7/2018 | Potter et al. |
| 10,019,901 B1 | 7/2018 | Fields et al. |
| 10,026,130 B1 | 7/2018 | Konrardy et al. |
| 10,026,237 B1 | 7/2018 | Fields et al. |
| 10,042,359 B1 | 8/2018 | Konrardy et al. |
| 10,043,323 B1 | 8/2018 | Konrardy et al. |
| 10,055,794 B1 | 8/2018 | Konrardy et al. |
| 10,065,517 B1 | 9/2018 | Konrardy et al. |
| 10,086,782 B1 | 10/2018 | Konrardy et al. |
| 10,089,693 B1 | 10/2018 | Konrardy et al. |
| 10,102,587 B1 | 10/2018 | Potter et al. |
| 10,102,590 B1 | 10/2018 | Farnsworth et al. |
| 10,106,083 B1 | 10/2018 | Fields et al. |
| 10,134,278 B1 | 11/2018 | Konrardy et al. |
| 10,156,848 B1 | 12/2018 | Konrardy et al. |
| 10,157,423 B1 | 12/2018 | Fields et al. |
| 10,163,327 B1 * | 12/2018 | Potter .................. B60W 40/09 |
| 10,163,350 B1 | 12/2018 | Fields et al. |
| 10,166,994 B1 | 1/2019 | Fields et al. |
| 10,168,703 B1 | 1/2019 | Konrardy et al. |
| 10,181,161 B1 | 1/2019 | Konrardy et al. |
| 10,185,997 B1 | 1/2019 | Konrardy et al. |
| 10,185,998 B1 | 1/2019 | Konrardy et al. |
| 10,185,999 B1 | 1/2019 | Konrardy et al. |
| 10,223,479 B1 | 3/2019 | Konrardy et al. |
| 10,354,330 B1 | 7/2019 | Konrardy et al. |
| 10,529,027 B1 | 1/2020 | Konrardy et al. |
| 2001/0005217 A1 | 6/2001 | Hamilton et al. |
| 2002/0016655 A1 | 2/2002 | Joao |
| 2002/0049535 A1 | 4/2002 | Rigo et al. |
| 2002/0091483 A1 | 7/2002 | Douet |
| 2002/0103622 A1 | 8/2002 | Burge |
| 2002/0103678 A1 | 8/2002 | Burkhalter et al. |
| 2002/0111725 A1 | 8/2002 | Burge |
| 2002/0116228 A1 | 8/2002 | Bauer et al. |
| 2002/0128751 A1 | 9/2002 | Engstrom et al. |
| 2002/0128882 A1 | 9/2002 | Nakagawa et al. |
| 2002/0135618 A1 | 9/2002 | Maes et al. |
| 2002/0146667 A1 | 10/2002 | Dowdell et al. |
| 2003/0028298 A1 | 2/2003 | Macky et al. |
| 2003/0046003 A1 | 3/2003 | Smith |
| 2003/0061160 A1 | 3/2003 | Asahina |
| 2003/0095039 A1 | 5/2003 | Shimomura et al. |
| 2003/0112133 A1 | 6/2003 | Webb et al. |
| 2003/0120576 A1 | 6/2003 | Duckworth |
| 2003/0139948 A1 | 7/2003 | Strech |
| 2003/0146850 A1 | 8/2003 | Fallenstein |
| 2003/0182042 A1 | 9/2003 | Watson et al. |
| 2003/0182183 A1 | 9/2003 | Pribe |
| 2003/0200123 A1 | 10/2003 | Burge et al. |
| 2004/0005927 A1 | 1/2004 | Bonilla et al. |
| 2004/0017106 A1 | 1/2004 | Aizawa et al. |
| 2004/0019539 A1 | 1/2004 | Raman et al. |

(56) References Cited

U.S. PATENT DOCUMENTS

| | | |
|---|---|---|
| 2004/0039503 A1 | 2/2004 | Doyle |
| 2004/0054452 A1 | 3/2004 | Bjorkman |
| 2004/0077285 A1 | 4/2004 | Bonilla et al. |
| 2004/0085198 A1 | 5/2004 | Saito et al. |
| 2004/0085211 A1 | 5/2004 | Gotfried |
| 2004/0090334 A1 | 5/2004 | Zhang et al. |
| 2004/0111301 A1 | 6/2004 | Wahlbin et al. |
| 2004/0122639 A1 | 6/2004 | Qiu |
| 2004/0139034 A1 | 7/2004 | Farmer |
| 2004/0153362 A1 | 8/2004 | Bauer et al. |
| 2004/0158476 A1 | 8/2004 | Blessinger et al. |
| 2004/0169034 A1 | 9/2004 | Park |
| 2004/0185842 A1 | 9/2004 | Spaur et al. |
| 2004/0198441 A1 | 10/2004 | Cooper |
| 2004/0226043 A1 | 11/2004 | Mettu et al. |
| 2004/0252027 A1 | 12/2004 | Torkkola et al. |
| 2004/0260579 A1 | 12/2004 | Tremiti |
| 2005/0007438 A1 | 1/2005 | Busch et al. |
| 2005/0046584 A1 | 3/2005 | Breed |
| 2005/0055249 A1 | 3/2005 | Helitzer et al. |
| 2005/0059151 A1 | 3/2005 | Bosch |
| 2005/0065678 A1 | 3/2005 | Smith et al. |
| 2005/0071052 A1 | 3/2005 | Coletrane et al. |
| 2005/0071202 A1 | 3/2005 | Kendrick |
| 2005/0073438 A1 | 4/2005 | Rodgers et al. |
| 2005/0075782 A1 | 4/2005 | Torgunrud |
| 2005/0080519 A1 | 4/2005 | Oesterling et al. |
| 2005/0088291 A1 | 4/2005 | Blanco et al. |
| 2005/0088521 A1 | 4/2005 | Blanco et al. |
| 2005/0093684 A1 | 5/2005 | Cunnien |
| 2005/0108065 A1* | 5/2005 | Dorfstatter ............ G06Q 40/08 705/4 |
| 2005/0108910 A1 | 5/2005 | Esparza et al. |
| 2005/0131597 A1 | 6/2005 | Raz et al. |
| 2005/0134443 A1 | 6/2005 | Hottebart |
| 2005/0154513 A1 | 7/2005 | Matsunaga et al. |
| 2005/0174217 A1 | 8/2005 | Basir et al. |
| 2005/0216136 A1 | 9/2005 | Lengning et al. |
| 2005/0227712 A1 | 10/2005 | Estevez et al. |
| 2005/0228763 A1 | 10/2005 | Lewis et al. |
| 2005/0237784 A1 | 10/2005 | Kang |
| 2005/0246256 A1 | 11/2005 | Gastineau et al. |
| 2005/0259151 A1 | 11/2005 | Hamilton et al. |
| 2005/0267784 A1 | 12/2005 | Slen et al. |
| 2006/0010665 A1 | 1/2006 | Watzl |
| 2006/0031103 A1 | 2/2006 | Henry |
| 2006/0052909 A1 | 3/2006 | Cherouny |
| 2006/0052929 A1 | 3/2006 | Bastian et al. |
| 2006/0053038 A1 | 3/2006 | Warren et al. |
| 2006/0055565 A1 | 3/2006 | Kawamata et al. |
| 2006/0079280 A1 | 4/2006 | LaPerch |
| 2006/0089766 A1 | 4/2006 | Allard et al. |
| 2006/0092043 A1 | 5/2006 | Lagassey |
| 2006/0095302 A1 | 5/2006 | Vahidi |
| 2006/0106650 A1 | 5/2006 | Bush |
| 2006/0136291 A1 | 6/2006 | Morita et al. |
| 2006/0149461 A1 | 7/2006 | Rowley et al. |
| 2006/0155616 A1 | 7/2006 | Moore |
| 2006/0184295 A1 | 8/2006 | Hawkins et al. |
| 2006/0212195 A1 | 9/2006 | Veith |
| 2006/0220905 A1 | 10/2006 | Hovestadt |
| 2006/0229777 A1 | 10/2006 | Hudson et al. |
| 2006/0232430 A1 | 10/2006 | Takaoka et al. |
| 2006/0244746 A1 | 11/2006 | England |
| 2006/0294514 A1 | 12/2006 | Bauchot et al. |
| 2007/0001831 A1 | 1/2007 | Raz et al. |
| 2007/0048707 A1 | 3/2007 | Caamano et al. |
| 2007/0055422 A1 | 3/2007 | Anzai et al. |
| 2007/0080816 A1 | 4/2007 | Haque et al. |
| 2007/0088469 A1 | 4/2007 | Schmiedel et al. |
| 2007/0093947 A1 | 4/2007 | Gould et al. |
| 2007/0122771 A1 | 5/2007 | Maeda et al. |
| 2007/0124599 A1 | 5/2007 | Morita et al. |
| 2007/0132773 A1 | 6/2007 | Plante |
| 2007/0149208 A1 | 6/2007 | Syrbe et al. |
| 2007/0159344 A1 | 7/2007 | Kisacanin |
| 2007/0159354 A1 | 7/2007 | Rosenberg |
| 2007/0208498 A1 | 9/2007 | Barker et al. |
| 2007/0219720 A1 | 9/2007 | Trepagnier et al. |
| 2007/0249372 A1 | 10/2007 | Gao |
| 2007/0263628 A1 | 11/2007 | Axelsson et al. |
| 2007/0265540 A1 | 11/2007 | Fuwamoto et al. |
| 2007/0282489 A1 | 12/2007 | Boss et al. |
| 2007/0282638 A1 | 12/2007 | Surovy |
| 2007/0291130 A1 | 12/2007 | Broggi et al. |
| 2007/0299700 A1 | 12/2007 | Gay et al. |
| 2008/0007451 A1 | 1/2008 | De et al. |
| 2008/0027761 A1 | 1/2008 | Bracha |
| 2008/0028974 A1 | 2/2008 | Bianco |
| 2008/0052134 A1 | 2/2008 | Nowak et al. |
| 2008/0061953 A1 | 3/2008 | Bhogal et al. |
| 2008/0064014 A1 | 3/2008 | Wojtczak et al. |
| 2008/0065427 A1 | 3/2008 | Helitzer et al. |
| 2008/0077451 A1 | 3/2008 | Anthony |
| 2008/0082372 A1 | 4/2008 | Burch |
| 2008/0084473 A1 | 4/2008 | Romanowich |
| 2008/0106390 A1 | 5/2008 | White |
| 2008/0111666 A1 | 5/2008 | Plante et al. |
| 2008/0114502 A1 | 5/2008 | Breed et al. |
| 2008/0114530 A1 | 5/2008 | Petrisor et al. |
| 2008/0126137 A1 | 5/2008 | Kidd et al. |
| 2008/0143497 A1 | 6/2008 | Wasson et al. |
| 2008/0147265 A1 | 6/2008 | Breed |
| 2008/0147266 A1 | 6/2008 | Plante et al. |
| 2008/0147267 A1 | 6/2008 | Plante et al. |
| 2008/0161989 A1 | 7/2008 | Breed |
| 2008/0167821 A1 | 7/2008 | Breed |
| 2008/0180237 A1 | 7/2008 | Fayyad et al. |
| 2008/0189142 A1 | 8/2008 | Brown et al. |
| 2008/0195457 A1 | 8/2008 | Sherman et al. |
| 2008/0204256 A1 | 8/2008 | Omi |
| 2008/0243558 A1 | 10/2008 | Gupte |
| 2008/0255887 A1 | 10/2008 | Gruter |
| 2008/0255888 A1 | 10/2008 | Berkobin et al. |
| 2008/0258885 A1 | 10/2008 | Akhan |
| 2008/0258890 A1 | 10/2008 | Follmer et al. |
| 2008/0291008 A1 | 11/2008 | Jeon |
| 2008/0294690 A1 | 11/2008 | McClellan et al. |
| 2008/0297488 A1 | 12/2008 | Operowsky et al. |
| 2008/0300733 A1 | 12/2008 | Rasshofer et al. |
| 2008/0306996 A1 | 12/2008 | McClellan |
| 2008/0313007 A1 | 12/2008 | Callahan et al. |
| 2008/0319665 A1 | 12/2008 | Berkobin et al. |
| 2009/0005979 A1 | 1/2009 | Nakao et al. |
| 2009/0015684 A1 | 1/2009 | Ooga et al. |
| 2009/0027188 A1 | 1/2009 | Saban |
| 2009/0040060 A1 | 2/2009 | Anbuhl |
| 2009/0063030 A1 | 3/2009 | Howarter et al. |
| 2009/0063174 A1 | 3/2009 | Fricke |
| 2009/0069953 A1 | 3/2009 | Hale et al. |
| 2009/0079839 A1 | 3/2009 | Fischer et al. |
| 2009/0081923 A1 | 3/2009 | Dooley et al. |
| 2009/0085770 A1 | 4/2009 | Mergen |
| 2009/0106135 A1 | 4/2009 | Steiger |
| 2009/0115638 A1 | 5/2009 | Shankwitz et al. |
| 2009/0132294 A1 | 5/2009 | Haines |
| 2009/0140887 A1 | 6/2009 | Breed et al. |
| 2009/0174573 A1 | 7/2009 | Smith |
| 2009/0207005 A1 | 8/2009 | Habetha et al. |
| 2009/0210257 A1 | 8/2009 | Chalfant et al. |
| 2009/0247113 A1 | 10/2009 | Sennett |
| 2009/0254240 A1 | 10/2009 | Olsen et al. |
| 2009/0267801 A1 | 10/2009 | Kawai et al. |
| 2009/0300065 A1 | 12/2009 | Birchall |
| 2009/0303026 A1 | 12/2009 | Broggi et al. |
| 2010/0004995 A1 | 1/2010 | Hickman |
| 2010/0005649 A1 | 1/2010 | Kim et al. |
| 2010/0013130 A1 | 1/2010 | Ramirez et al. |
| 2010/0014570 A1 | 1/2010 | Dupis et al. |
| 2010/0015706 A1 | 1/2010 | Quay et al. |
| 2010/0030540 A1 | 2/2010 | Choi |
| 2010/0030586 A1 | 2/2010 | Taylor et al. |
| 2010/0042318 A1 | 2/2010 | Kaplan et al. |
| 2010/0043524 A1 | 2/2010 | Takata |

(56) References Cited

U.S. PATENT DOCUMENTS

| | | |
|---|---|---|
| 2010/0055649 A1 | 3/2010 | Takahashi et al. |
| 2010/0076646 A1 | 3/2010 | Basir et al. |
| 2010/0085171 A1 | 4/2010 | Do |
| 2010/0106346 A1 | 4/2010 | Badli et al. |
| 2010/0106356 A1 | 4/2010 | Trepagnier et al. |
| 2010/0128127 A1 | 5/2010 | Ciolli |
| 2010/0131300 A1 | 5/2010 | Collopy et al. |
| 2010/0131302 A1 | 5/2010 | Collopy et al. |
| 2010/0131304 A1 | 5/2010 | Collopy |
| 2010/0131307 A1 | 5/2010 | Collopy et al. |
| 2010/0142477 A1 | 6/2010 | Yokota |
| 2010/0143872 A1 | 6/2010 | Lankteee |
| 2010/0145700 A1 | 6/2010 | Kennewick |
| 2010/0157061 A1 | 6/2010 | Katsman |
| 2010/0157255 A1 | 6/2010 | Togino |
| 2010/0164737 A1 | 7/2010 | Lu et al. |
| 2010/0198491 A1 | 8/2010 | Mays |
| 2010/0205012 A1 | 8/2010 | McClellan |
| 2010/0214087 A1 | 8/2010 | Nakagoshi et al. |
| 2010/0219944 A1 | 9/2010 | Mc Cormick et al. |
| 2010/0253541 A1 | 10/2010 | Seder et al. |
| 2010/0256836 A1 | 10/2010 | Mudalige |
| 2010/0286845 A1 | 11/2010 | Rekow et al. |
| 2010/0293033 A1 | 11/2010 | Hall |
| 2010/0299021 A1 | 11/2010 | Jalili |
| 2010/0332131 A1 | 12/2010 | Horvitz |
| 2011/0009093 A1 | 1/2011 | Self et al. |
| 2011/0010042 A1 | 1/2011 | Boulet et al. |
| 2011/0043350 A1 | 2/2011 | Ben David |
| 2011/0043377 A1 | 2/2011 | McGrath et al. |
| 2011/0054767 A1 | 3/2011 | Schafer et al. |
| 2011/0060496 A1 | 3/2011 | Nielsen et al. |
| 2011/0066310 A1 | 3/2011 | Sakai et al. |
| 2011/0077809 A1 | 3/2011 | Leary |
| 2011/0087505 A1 | 4/2011 | Terlep |
| 2011/0090075 A1 | 4/2011 | Armitage et al. |
| 2011/0090093 A1 | 4/2011 | Grimm et al. |
| 2011/0093134 A1 | 4/2011 | Emanuel et al. |
| 2011/0093350 A1 | 4/2011 | Laumeyer et al. |
| 2011/0106370 A1 | 5/2011 | Duddle et al. |
| 2011/0109462 A1 | 5/2011 | Deng et al. |
| 2011/0118907 A1 | 5/2011 | Elkins |
| 2011/0128161 A1 | 6/2011 | Bae et al. |
| 2011/0133954 A1 | 6/2011 | Ooshima et al. |
| 2011/0137684 A1 | 6/2011 | Peak et al. |
| 2011/0140919 A1 | 6/2011 | Hara et al. |
| 2011/0140968 A1 | 6/2011 | Bai et al. |
| 2011/0144854 A1 | 6/2011 | Cramer et al. |
| 2011/0153367 A1 | 6/2011 | Amigo |
| 2011/0161116 A1 | 6/2011 | Peak et al. |
| 2011/0161119 A1 | 6/2011 | Collins |
| 2011/0169625 A1 | 7/2011 | James et al. |
| 2011/0184605 A1 | 7/2011 | Neff |
| 2011/0187559 A1 | 8/2011 | Applebaum |
| 2011/0190972 A1 | 8/2011 | Timmons et al. |
| 2011/0196571 A1 | 8/2011 | Foladare et al. |
| 2011/0202305 A1 | 8/2011 | Willis et al. |
| 2011/0238997 A1 | 9/2011 | Bellur |
| 2011/0246244 A1 | 10/2011 | O'Rourke |
| 2011/0251751 A1 | 10/2011 | Knight |
| 2011/0279263 A1 | 11/2011 | Rodkey et al. |
| 2011/0288770 A1 | 11/2011 | Greasby |
| 2011/0295446 A1 | 12/2011 | Basir et al. |
| 2011/0295546 A1 | 12/2011 | Khazanov |
| 2011/0301839 A1 | 12/2011 | Pudar et al. |
| 2011/0304465 A1 | 12/2011 | Boult et al. |
| 2011/0307188 A1 | 12/2011 | Peng |
| 2011/0307336 A1 | 12/2011 | Smirnov et al. |
| 2012/0004933 A1 | 1/2012 | Foladare et al. |
| 2012/0007224 A1 | 1/2012 | Hasebe et al. |
| 2012/0010185 A1 | 1/2012 | Stenkamp et al. |
| 2012/0010906 A1 | 1/2012 | Foladare et al. |
| 2012/0013582 A1 | 1/2012 | Inoue et al. |
| 2012/0019001 A1 | 1/2012 | Hede et al. |
| 2012/0025969 A1 | 2/2012 | Dozza |
| 2012/0028680 A1 | 2/2012 | Breed |
| 2012/0053824 A1 | 3/2012 | Nam et al. |
| 2012/0056758 A1 | 3/2012 | Kuhlman et al. |
| 2012/0059227 A1 | 3/2012 | Friedlander et al. |
| 2012/0066007 A1 | 3/2012 | Ferrick et al. |
| 2012/0071151 A1 | 3/2012 | Abramson et al. |
| 2012/0072214 A1 | 3/2012 | Cox et al. |
| 2012/0072243 A1 | 3/2012 | Collins et al. |
| 2012/0072244 A1 | 3/2012 | Collins |
| 2012/0081221 A1 | 4/2012 | Doerr |
| 2012/0083668 A1 | 4/2012 | Pradeep et al. |
| 2012/0083960 A1 | 4/2012 | Zhu et al. |
| 2012/0083964 A1 | 4/2012 | Montemerlo et al. |
| 2012/0083974 A1 | 4/2012 | Sandblom |
| 2012/0092157 A1 | 4/2012 | Tran |
| 2012/0101855 A1 | 4/2012 | Collins |
| 2012/0108909 A1 | 5/2012 | Slobounov et al. |
| 2012/0109407 A1 | 5/2012 | Yousefi et al. |
| 2012/0109692 A1 | 5/2012 | Collins et al. |
| 2012/0116548 A1 | 5/2012 | Goree et al. |
| 2012/0123806 A1 | 5/2012 | Schumann, Jr. et al. |
| 2012/0129545 A1 | 5/2012 | Hodis et al. |
| 2012/0135382 A1 | 5/2012 | Winston et al. |
| 2012/0143391 A1 | 6/2012 | Gee |
| 2012/0143630 A1 | 6/2012 | Hertensteln |
| 2012/0146766 A1 | 6/2012 | Geisler |
| 2012/0172055 A1 | 7/2012 | Edge |
| 2012/0185204 A1 | 7/2012 | Jallon et al. |
| 2012/0188100 A1 | 7/2012 | Min et al. |
| 2012/0190001 A1 | 7/2012 | Knight et al. |
| 2012/0191343 A1 | 7/2012 | Haleem |
| 2012/0191373 A1 | 7/2012 | Soles et al. |
| 2012/0197669 A1 | 8/2012 | Kote et al. |
| 2012/0200427 A1 | 8/2012 | Kamata |
| 2012/0203418 A1 | 8/2012 | Braennstroem et al. |
| 2012/0209634 A1 | 8/2012 | Ling et al. |
| 2012/0209692 A1 | 8/2012 | Bennett et al. |
| 2012/0215375 A1 | 8/2012 | Chang |
| 2012/0235865 A1 | 9/2012 | Nath et al. |
| 2012/0239242 A1 | 9/2012 | Uehara |
| 2012/0239281 A1 | 9/2012 | Hinz |
| 2012/0239471 A1 | 9/2012 | Grimm et al. |
| 2012/0239822 A1 | 9/2012 | Poulson |
| 2012/0246733 A1 | 9/2012 | Schafer et al. |
| 2012/0256769 A1 | 10/2012 | Satpathy |
| 2012/0258702 A1 | 10/2012 | Matsuyama |
| 2012/0271500 A1 | 10/2012 | Tsimhoni et al. |
| 2012/0277950 A1 | 11/2012 | Plante et al. |
| 2012/0284747 A1 | 11/2012 | Joao |
| 2012/0286974 A1 | 11/2012 | Claussen et al. |
| 2012/0289819 A1 | 11/2012 | Snow |
| 2012/0303177 A1 | 11/2012 | Jauch et al. |
| 2012/0303222 A1 | 11/2012 | Cooprider et al. |
| 2012/0303392 A1 | 11/2012 | Depura et al. |
| 2012/0306663 A1 | 12/2012 | Mudalige |
| 2012/0315848 A1 | 12/2012 | Smith et al. |
| 2012/0316406 A1 | 12/2012 | Rahman et al. |
| 2013/0006674 A1 | 1/2013 | Bowne |
| 2013/0006675 A1 | 1/2013 | Bowne |
| 2013/0017846 A1 | 1/2013 | Schoppe |
| 2013/0018677 A1 | 1/2013 | Chevrette |
| 2013/0030275 A1 | 1/2013 | Seymour et al. |
| 2013/0030606 A1 | 1/2013 | Mudalige et al. |
| 2013/0030642 A1 | 1/2013 | Bradley |
| 2013/0038437 A1 | 2/2013 | Talati et al. |
| 2013/0044008 A1 | 2/2013 | Gafford et al. |
| 2013/0046562 A1 | 2/2013 | Taylor et al. |
| 2013/0057671 A1 | 3/2013 | Levin et al. |
| 2013/0066751 A1 | 3/2013 | Glazer et al. |
| 2013/0073115 A1 | 3/2013 | Levin et al. |
| 2013/0073318 A1 | 3/2013 | Feldman |
| 2013/0073321 A1 | 3/2013 | Hofmann |
| 2013/0093886 A1 | 4/2013 | Rothschild |
| 2013/0097128 A1 | 4/2013 | Suzuki et al. |
| 2013/0116855 A1 | 5/2013 | Nielsen et al. |
| 2013/0131907 A1 | 5/2013 | Green et al. |
| 2013/0144459 A1 | 6/2013 | Ricci |
| 2013/0144657 A1 | 6/2013 | Ricci |
| 2013/0151027 A1 | 6/2013 | Petrucci et al. |

(56) References Cited

U.S. PATENT DOCUMENTS

| | | |
|---|---|---|
| 2013/0151202 A1 | 6/2013 | Denny et al. |
| 2013/0164715 A1 | 6/2013 | Hunt et al. |
| 2013/0179198 A1 | 7/2013 | Bowne |
| 2013/0189649 A1 | 7/2013 | Mannino |
| 2013/0190966 A1 | 7/2013 | Collins et al. |
| 2013/0209968 A1 | 8/2013 | Miller et al. |
| 2013/0218603 A1 | 8/2013 | Hagelstein et al. |
| 2013/0218604 A1 | 8/2013 | Hagelstein et al. |
| 2013/0226391 A1 | 8/2013 | Nordbruch et al. |
| 2013/0227409 A1 | 8/2013 | Das et al. |
| 2013/0237194 A1 | 9/2013 | Davis |
| 2013/0245857 A1 | 9/2013 | Gariepy et al. |
| 2013/0245881 A1 | 9/2013 | Scarbrough |
| 2013/0257626 A1 | 10/2013 | Masli et al. |
| 2013/0267194 A1 | 10/2013 | Breed |
| 2013/0278442 A1 | 10/2013 | Rubin et al. |
| 2013/0289819 A1 | 10/2013 | Hassib et al. |
| 2013/0290037 A1 | 10/2013 | Hu |
| 2013/0297418 A1 | 11/2013 | Collopy et al. |
| 2013/0302758 A1* | 11/2013 | Wright .................. G07C 5/008 434/65 |
| 2013/0304513 A1 | 11/2013 | Hyde et al. |
| 2013/0304514 A1 | 11/2013 | Hyde et al. |
| 2013/0307786 A1 | 11/2013 | Heubel |
| 2013/0317665 A1 | 11/2013 | Fernandes |
| 2013/0317693 A1 | 11/2013 | Jefferies et al. |
| 2013/0317711 A1 | 11/2013 | Plante |
| 2013/0317786 A1 | 11/2013 | Kuhn |
| 2013/0317865 A1 | 11/2013 | Tofte |
| 2013/0332402 A1 | 12/2013 | Rakshit |
| 2013/0339062 A1 | 12/2013 | Brewer |
| 2014/0002651 A1 | 1/2014 | Plante |
| 2014/0004734 A1 | 1/2014 | Hoang |
| 2014/0006660 A1 | 1/2014 | Frei et al. |
| 2014/0009307 A1 | 1/2014 | Bowers et al. |
| 2014/0011647 A1 | 1/2014 | Lalaoua |
| 2014/0012492 A1 | 1/2014 | Bowers et al. |
| 2014/0013965 A1 | 1/2014 | Perez |
| 2014/0019170 A1 | 1/2014 | Coleman et al. |
| 2014/0027790 A1 | 1/2014 | Lin et al. |
| 2014/0030073 A1 | 1/2014 | Lacy et al. |
| 2014/0039934 A1 | 2/2014 | Rivera |
| 2014/0047347 A1 | 2/2014 | Mohn et al. |
| 2014/0047371 A1 | 2/2014 | Palmer et al. |
| 2014/0052323 A1 | 2/2014 | Reichel et al. |
| 2014/0052336 A1 | 2/2014 | Moshchuk et al. |
| 2014/0052479 A1 | 2/2014 | Kawamura |
| 2014/0058761 A1 | 2/2014 | Freiberger et al. |
| 2014/0059066 A1 | 2/2014 | Koloskov |
| 2014/0063064 A1 | 3/2014 | Seo |
| 2014/0070980 A1 | 3/2014 | Park |
| 2014/0080100 A1 | 3/2014 | Phelan et al. |
| 2014/0095009 A1 | 4/2014 | Oshima et al. |
| 2014/0095214 A1 | 4/2014 | Mathe et al. |
| 2014/0099607 A1 | 4/2014 | Armitage et al. |
| 2014/0100892 A1 | 4/2014 | Collopy et al. |
| 2014/0104405 A1 | 4/2014 | Weidl et al. |
| 2014/0106782 A1 | 4/2014 | Chitre |
| 2014/0108198 A1 | 4/2014 | Jariyasunant et al. |
| 2014/0111332 A1 | 4/2014 | Przybylko et al. |
| 2014/0111647 A1 | 4/2014 | Atsmon et al. |
| 2014/0114691 A1 | 4/2014 | Pearce |
| 2014/0125474 A1 | 5/2014 | Gunaratne |
| 2014/0129053 A1 | 5/2014 | Kleve et al. |
| 2014/0129139 A1 | 5/2014 | Ellison |
| 2014/0129301 A1 | 5/2014 | Van et al. |
| 2014/0130035 A1 | 5/2014 | Desai et al. |
| 2014/0135598 A1 | 5/2014 | Weidl et al. |
| 2014/0139655 A1 | 5/2014 | Mimar |
| 2014/0148988 A1 | 5/2014 | Lathrop et al. |
| 2014/0149148 A1 | 5/2014 | Luciani |
| 2014/0152422 A1 | 6/2014 | Breed |
| 2014/0156176 A1 | 6/2014 | Caskey et al. |
| 2014/0167967 A1 | 6/2014 | He |
| 2014/0168399 A1 | 6/2014 | Plummer et al. |
| 2014/0172467 A1 | 6/2014 | He |
| 2014/0172727 A1 | 6/2014 | Abhyanker et al. |
| 2014/0180727 A1 | 6/2014 | Freiberger |
| 2014/0188322 A1 | 7/2014 | Oh et al. |
| 2014/0191858 A1 | 7/2014 | Morgan |
| 2014/0207707 A1 | 7/2014 | Na et al. |
| 2014/0218187 A1 | 8/2014 | Chun et al. |
| 2014/0218520 A1 | 8/2014 | Teich et al. |
| 2014/0221781 A1 | 8/2014 | Schrauf et al. |
| 2014/0236638 A1 | 8/2014 | Pallesen et al. |
| 2014/0240132 A1 | 8/2014 | Bychkov |
| 2014/0253376 A1 | 9/2014 | Large et al. |
| 2014/0257866 A1 | 9/2014 | Gay et al. |
| 2014/0257869 A1 | 9/2014 | Binion |
| 2014/0266655 A1 | 9/2014 | Palan |
| 2014/0272810 A1 | 9/2014 | Fields et al. |
| 2014/0272811 A1 | 9/2014 | Palan |
| 2014/0277902 A1 | 9/2014 | Koch |
| 2014/0277916 A1 | 9/2014 | Mullen et al. |
| 2014/0278569 A1 | 9/2014 | Sanchez |
| 2014/0278571 A1 | 9/2014 | Mullen et al. |
| 2014/0278586 A1 | 9/2014 | Sanchez et al. |
| 2014/0278840 A1 | 9/2014 | Scofield et al. |
| 2014/0279707 A1 | 9/2014 | Joshua |
| 2014/0300739 A1 | 10/2014 | Mimar |
| 2014/0301218 A1 | 10/2014 | Luo et al. |
| 2014/0306799 A1 | 10/2014 | Ricci |
| 2014/0306814 A1 | 10/2014 | Ricci |
| 2014/0309864 A1 | 10/2014 | Ricci |
| 2014/0309870 A1 | 10/2014 | Ricci et al. |
| 2014/0310186 A1 | 10/2014 | Ricci |
| 2014/0335902 A1 | 11/2014 | Guba |
| 2014/0337930 A1 | 11/2014 | Hoyos et al. |
| 2014/0343972 A1 | 11/2014 | Fernandes et al. |
| 2014/0350970 A1 | 11/2014 | Schumann et al. |
| 2014/0358324 A1 | 12/2014 | Sagan et al. |
| 2014/0358592 A1 | 12/2014 | Vvedig et al. |
| 2014/0376410 A1 | 12/2014 | Ros |
| 2014/0378082 A1 | 12/2014 | Ros |
| 2014/0379385 A1 | 12/2014 | Duncan |
| 2014/0380264 A1 | 12/2014 | Misra et al. |
| 2015/0006278 A1 | 1/2015 | Di et al. |
| 2015/0019266 A1 | 1/2015 | Stempora |
| 2015/0024705 A1 | 1/2015 | Rashidi |
| 2015/0025917 A1 | 1/2015 | Stempora |
| 2015/0032581 A1 | 1/2015 | Blackhurst et al. |
| 2015/0035685 A1 | 2/2015 | Strickland et al. |
| 2015/0039348 A1 | 2/2015 | Miller |
| 2015/0039350 A1 | 2/2015 | Martin |
| 2015/0039397 A1 | 2/2015 | Fuchs |
| 2015/0045983 A1 | 2/2015 | Fraser et al. |
| 2015/0051752 A1 | 2/2015 | Paszkowicz |
| 2015/0051787 A1 | 2/2015 | Doughty et al. |
| 2015/0058046 A1 | 2/2015 | Huynh |
| 2015/0066284 A1 | 3/2015 | Yopp |
| 2015/0070265 A1 | 3/2015 | Cruz-Hernandez et al. |
| 2015/0088334 A1 | 3/2015 | Bowers et al. |
| 2015/0088358 A1 | 3/2015 | Yopp |
| 2015/0088360 A1 | 3/2015 | Bonnet et al. |
| 2015/0088373 A1 | 3/2015 | Wilkins |
| 2015/0088550 A1 | 3/2015 | Bowers et al. |
| 2015/0095132 A1 | 4/2015 | Van et al. |
| 2015/0100189 A1 | 4/2015 | Tellis et al. |
| 2015/0100190 A1 | 4/2015 | Yopp |
| 2015/0100191 A1 | 4/2015 | Yopp |
| 2015/0100353 A1 | 4/2015 | Hughes et al. |
| 2015/0109450 A1 | 4/2015 | Walker |
| 2015/0112504 A1 | 4/2015 | Binion et al. |
| 2015/0112543 A1 | 4/2015 | Binion et al. |
| 2015/0112545 A1 | 4/2015 | Binion et al. |
| 2015/0112730 A1 | 4/2015 | Binion et al. |
| 2015/0112731 A1 | 4/2015 | Binion et al. |
| 2015/0112800 A1 | 4/2015 | Binion et al. |
| 2015/0113521 A1 | 4/2015 | Suzuki et al. |
| 2015/0120331 A1 | 4/2015 | Russo et al. |
| 2015/0127570 A1* | 5/2015 | Doughty .................. G06Q 10/00 705/325 |
| 2015/0128123 A1 | 5/2015 | Eling |
| 2015/0142262 A1 | 5/2015 | Lee |

(56) References Cited

U.S. PATENT DOCUMENTS

| | | |
|---|---|---|
| 2015/0149018 A1 | 5/2015 | Attard et al. |
| 2015/0149265 A1 | 5/2015 | Huntzicker et al. |
| 2015/0153733 A1 | 6/2015 | Ohmura et al. |
| 2015/0154711 A1 | 6/2015 | Christopulos |
| 2015/0158469 A1 | 6/2015 | Cheatham, III et al. |
| 2015/0158495 A1 | 6/2015 | Duncan et al. |
| 2015/0160653 A1 | 6/2015 | Cheatham, III et al. |
| 2015/0161738 A1 | 6/2015 | Stempora |
| 2015/0161893 A1 | 6/2015 | Duncan et al. |
| 2015/0161894 A1 | 6/2015 | Duncan et al. |
| 2015/0166069 A1 | 6/2015 | Engelman et al. |
| 2015/0169311 A1 | 6/2015 | Dickerson et al. |
| 2015/0170287 A1 | 6/2015 | Tirone et al. |
| 2015/0170290 A1 | 6/2015 | Bowne et al. |
| 2015/0170522 A1 | 6/2015 | Noh |
| 2015/0178997 A1 | 6/2015 | Ohsaki |
| 2015/0178998 A1 | 6/2015 | Attard et al. |
| 2015/0185034 A1 | 7/2015 | Abhyanker |
| 2015/0187013 A1 | 7/2015 | Adams et al. |
| 2015/0187015 A1 | 7/2015 | Adams et al. |
| 2015/0187016 A1 | 7/2015 | Adams et al. |
| 2015/0187019 A1 | 7/2015 | Fernandes et al. |
| 2015/0187194 A1 | 7/2015 | Hypolite et al. |
| 2015/0189241 A1 | 7/2015 | Kim et al. |
| 2015/0193219 A1 | 7/2015 | Pandya et al. |
| 2015/0193220 A1 | 7/2015 | Rork et al. |
| 2015/0203107 A1 | 7/2015 | Lippman |
| 2015/0203113 A1 | 7/2015 | Duncan et al. |
| 2015/0229885 A1 | 8/2015 | Offenhaeuser |
| 2015/0235323 A1 | 8/2015 | Oldham |
| 2015/0235557 A1 | 8/2015 | Engelman et al. |
| 2015/0239436 A1 | 8/2015 | Kanai et al. |
| 2015/0241853 A1 | 8/2015 | Vechart et al. |
| 2015/0242953 A1 | 8/2015 | Suiter |
| 2015/0246672 A1 | 9/2015 | Pilutti et al. |
| 2015/0254955 A1 | 9/2015 | Fields et al. |
| 2015/0266489 A1 | 9/2015 | Solyom et al. |
| 2015/0266490 A1 | 9/2015 | Coelingh et al. |
| 2015/0271201 A1 | 9/2015 | Ruvio et al. |
| 2015/0274072 A1 | 10/2015 | Croteau et al. |
| 2015/0293534 A1 | 10/2015 | Takamatsu |
| 2015/0294422 A1 | 10/2015 | Carver et al. |
| 2015/0302719 A1 | 10/2015 | Mroszczak et al. |
| 2015/0307110 A1 | 10/2015 | Grewe et al. |
| 2015/0310742 A1 | 10/2015 | Albornoz |
| 2015/0310758 A1 | 10/2015 | Daddona et al. |
| 2015/0332407 A1 | 11/2015 | Wilson et al. |
| 2015/0334545 A1 | 11/2015 | Maier et al. |
| 2015/0336502 A1 | 11/2015 | Hillis et al. |
| 2015/0338852 A1 | 11/2015 | Ramanujam |
| 2015/0339777 A1 | 11/2015 | Zhalov |
| 2015/0339928 A1 | 11/2015 | Ramanujam |
| 2015/0343947 A1 | 12/2015 | Bernico et al. |
| 2015/0346727 A1 | 12/2015 | Ramanujam |
| 2015/0348335 A1 | 12/2015 | Ramanujam |
| 2015/0348337 A1 | 12/2015 | Choi |
| 2015/0356797 A1 | 12/2015 | McBride et al. |
| 2015/0382085 A1 | 12/2015 | Lawrie-Fussey et al. |
| 2016/0014252 A1 | 1/2016 | Biderman et al. |
| 2016/0019790 A1 | 1/2016 | Tobolski et al. |
| 2016/0027276 A1 | 1/2016 | Freeck et al. |
| 2016/0036899 A1 | 2/2016 | Moody et al. |
| 2016/0042463 A1 | 2/2016 | Gillespie |
| 2016/0042644 A1 | 2/2016 | Velusamy |
| 2016/0042650 A1 | 2/2016 | Stenneth |
| 2016/0055750 A1 | 2/2016 | Linder et al. |
| 2016/0068103 A1 | 3/2016 | McNew et al. |
| 2016/0071418 A1 | 3/2016 | Oshida et al. |
| 2016/0083285 A1 | 3/2016 | De et al. |
| 2016/0086285 A1 | 3/2016 | Peters |
| 2016/0086393 A1 | 3/2016 | Collins et al. |
| 2016/0092962 A1 | 3/2016 | Wasserman |
| 2016/0093212 A1 | 3/2016 | Barfield, Jr. |
| 2016/0104250 A1 | 4/2016 | Allen et al. |
| 2016/0105365 A1 | 4/2016 | Droste et al. |
| 2016/0116913 A1 | 4/2016 | Niles |
| 2016/0117871 A1 | 4/2016 | McClellan et al. |
| 2016/0117928 A1 | 4/2016 | Hodges et al. |
| 2016/0125735 A1 | 5/2016 | Tuukkanen |
| 2016/0129917 A1 | 5/2016 | Gariepy et al. |
| 2016/0140783 A1 | 5/2016 | Catt et al. |
| 2016/0140784 A1 | 5/2016 | Akanuma et al. |
| 2016/0147226 A1 | 5/2016 | Akselrod et al. |
| 2016/0163217 A1 | 6/2016 | Harkness |
| 2016/0167652 A1 | 6/2016 | Slusar |
| 2016/0171521 A1 | 6/2016 | Ramirez et al. |
| 2016/0187127 A1 | 6/2016 | Purohit et al. |
| 2016/0187368 A1 | 6/2016 | Modi et al. |
| 2016/0189303 A1 | 6/2016 | Fuchs |
| 2016/0189306 A1 | 6/2016 | Bogovich |
| 2016/0189544 A1 | 6/2016 | Ricci |
| 2016/0203560 A1 | 7/2016 | Parameshwaran |
| 2016/0221575 A1 | 8/2016 | Posch et al. |
| 2016/0231746 A1 | 8/2016 | Hazelton et al. |
| 2016/0248598 A1 | 8/2016 | Lin et al. |
| 2016/0255154 A1 | 9/2016 | Kim et al. |
| 2016/0264132 A1 | 9/2016 | Paul et al. |
| 2016/0272219 A1 | 9/2016 | Ketfi-Cherif et al. |
| 2016/0275790 A1 | 9/2016 | Kang et al. |
| 2016/0277911 A1 | 9/2016 | Kang et al. |
| 2016/0282874 A1 | 9/2016 | Kurata et al. |
| 2016/0288833 A1 | 10/2016 | Heimberger et al. |
| 2016/0291153 A1 | 10/2016 | Mossau et al. |
| 2016/0292679 A1 | 10/2016 | Kolin et al. |
| 2016/0301698 A1 | 10/2016 | Katara et al. |
| 2016/0303969 A1 | 10/2016 | Akula |
| 2016/0304027 A1 | 10/2016 | Di et al. |
| 2016/0304038 A1 | 10/2016 | Chen et al. |
| 2016/0304091 A1 | 10/2016 | Remes |
| 2016/0313132 A1 | 10/2016 | Larroy |
| 2016/0314224 A1 | 10/2016 | Wei et al. |
| 2016/0323233 A1 | 11/2016 | Song et al. |
| 2016/0327949 A1 | 11/2016 | Wilson et al. |
| 2016/0343249 A1 | 11/2016 | Gao et al. |
| 2016/0347329 A1 | 12/2016 | Zelman et al. |
| 2016/0370194 A1 | 12/2016 | Colijn et al. |
| 2017/0001146 A1 | 1/2017 | Van et al. |
| 2017/0011465 A1 | 1/2017 | Anastassov |
| 2017/0015263 A1 | 1/2017 | Makled et al. |
| 2017/0017734 A1 | 1/2017 | Groh et al. |
| 2017/0017842 A1 | 1/2017 | Ma et al. |
| 2017/0023945 A1 | 1/2017 | Cavalcanti et al. |
| 2017/0024938 A1 | 1/2017 | Lindsay |
| 2017/0036678 A1 | 2/2017 | Takamatsu |
| 2017/0038773 A1 | 2/2017 | Gordon et al. |
| 2017/0067764 A1 | 3/2017 | Skupin et al. |
| 2017/0072967 A1 | 3/2017 | Fendt et al. |
| 2017/0076606 A1 | 3/2017 | Gupta et al. |
| 2017/0078948 A1 | 3/2017 | Guba et al. |
| 2017/0080900 A1 | 3/2017 | Huennekens et al. |
| 2017/0084175 A1 | 3/2017 | Sedlik et al. |
| 2017/0086028 A1 | 3/2017 | Hwang et al. |
| 2017/0106876 A1 | 4/2017 | Gordon et al. |
| 2017/0116794 A1 | 4/2017 | Gortsas |
| 2017/0120761 A1 | 5/2017 | Kapadia et al. |
| 2017/0123421 A1 | 5/2017 | Kentley et al. |
| 2017/0123428 A1 | 5/2017 | Levinson et al. |
| 2017/0136902 A1 | 5/2017 | Ricci |
| 2017/0147722 A1 | 5/2017 | Greenwood |
| 2017/0148324 A1 | 5/2017 | High et al. |
| 2017/0154479 A1 | 6/2017 | Kim |
| 2017/0168493 A1 | 6/2017 | Miller et al. |
| 2017/0169627 A1 | 6/2017 | Kim et al. |
| 2017/0176641 A1 | 6/2017 | Zhu et al. |
| 2017/0178422 A1 | 6/2017 | Wright |
| 2017/0178423 A1 | 6/2017 | Wright |
| 2017/0178424 A1 | 6/2017 | Wright |
| 2017/0192428 A1 | 7/2017 | Vogt et al. |
| 2017/0200367 A1 | 7/2017 | Mielenz |
| 2017/0212511 A1 | 7/2017 | Paiva et al. |
| 2017/0234689 A1 | 8/2017 | Gibson et al. |
| 2017/0236210 A1 | 8/2017 | Kumar et al. |
| 2017/0249844 A1 | 8/2017 | Perkins et al. |
| 2017/0270617 A1 | 9/2017 | Fernandes et al. |

(56) References Cited

U.S. PATENT DOCUMENTS

| | | |
|---|---|---|
| 2017/0274897 A1 | 9/2017 | Rink et al. |
| 2017/0308082 A1 | 10/2017 | Ullrich et al. |
| 2017/0309092 A1 | 10/2017 | Rosenbaum |
| 2017/0330448 A1 | 11/2017 | Moore et al. |
| 2018/0004223 A1 | 1/2018 | Baldwin |
| 2018/0013831 A1 | 1/2018 | Dey et al. |
| 2018/0046198 A1 | 2/2018 | Nordbruch et al. |
| 2018/0053411 A1 | 2/2018 | Wieskamp et al. |
| 2018/0075538 A1 | 3/2018 | Konrardy et al. |
| 2018/0080995 A1 | 3/2018 | Heinen |
| 2018/0099678 A1 | 4/2018 | Absmeier et al. |
| 2018/0194343 A1 | 7/2018 | Lorenz |
| 2018/0231979 A1 | 8/2018 | Miller et al. |
| 2018/0307250 A1 | 10/2018 | Harvey |

FOREIGN PATENT DOCUMENTS

| | | |
|---|---|---|
| EP | 3239686 A1 | 11/2017 |
| GB | 2488956 A | 9/2012 |
| GB | 2494727 A | 3/2013 |
| KR | 10-1515496 B1 | 5/2015 |
| WO | 2010/062899 A1 | 6/2010 |
| WO | 2012/145780 A2 | 11/2012 |
| WO | 2014/092769 A1 | 6/2014 |
| WO | 2014139821 A1 | 9/2014 |
| WO | WO-2014/148976 A1 | 9/2014 |
| WO | 2016/067610 A1 | 5/2016 |
| WO | WO-2016/156236 A1 | 10/2016 |
| WO | 2017/142931 A1 | 8/2017 |

OTHER PUBLICATIONS

U.S. Appl. No. 13/844,090, Office Action, dated Dec. 4, 2013.
U.S. Appl. No. 14/057,408, Notice of Allowance, dated Sep. 25, 2014.
U.S. Appl. No. 14/057,419, Notice of Allowance, dated Oct. 5, 2015.
U.S. Appl. No. 14/057,435, Notice of Allowance, dated Apr. 1, 2016.
U.S. Appl. No. 14/057,447, Final Office Action, dated Jun. 20, 2016.
U.S. Appl. No. 14/057,447, Nonfinal Office Action, dated Dec. 11, 2015.
U.S. Appl. No. 14/057,447, Nonfinal Office Action, dated Sep. 23, 2016.
U.S. Appl. No. 14/057,456, Final Office Action, dated Jun. 16, 2016.
U.S. Appl. No. 14/057,456, Final Office Action, dated Mar. 17, 2015.
U.S. Appl. No. 14/057,456, Nonfinal Office Action, dated Dec. 3, 2015.
U.S. Appl. No. 14/057,456, Nonfinal Office Action, dated Mar. 9, 2017.
U.S. Appl. No. 14/057,467, Final Office Action, dated Dec. 7, 2016.
U.S. Appl. No. 14/057,467, Final Office Action, dated Mar. 16, 2016.
U.S. Appl. No. 14/057,467, Nonfinal Office Action, dated Jul. 1, 2016.
U.S. Appl. No. 14/057,467, Nonfinal Office Action, dated Nov. 12, 2015.
U.S. Appl. No. 14/201,491, Final Office Action, dated Sep. 11, 2015.
U.S. Appl. No. 14/208,626, Notice of Allowance, dated May 11, 2015.
U.S. Appl. No. 14/208,626, Notice of Allowance, dated Sep. 1, 2015.
U.S. Appl. No. 14/215,789, Final Office Action, dated Mar. 11, 2016.
U.S. Appl. No. 14/255,934, Nonfinal Office Action, dated Jan. 15, 2015.
U.S. Appl. No. 14/255,934, Nonfinal Office Action, dated Jun. 18, 2014.
U.S. Appl. No. 14/255,934, Notice of Allowance, dated May 27, 2015.
U.S. Appl. No. 14/269,490, Nonfinal Office Action, dated Sep. 12, 2014.
U.S. Appl. No. 14/269,490, Notice of Allowance, dated Nov. 17, 2015.
U.S. Appl. No. 14/339,652, Final Office Action, dated Apr. 22, 2016.
U.S. Appl. No. 14/339,652, Nonfinal Office Action, dated Sep. 24, 2015.
U.S. Appl. No. 14/511,712, Final Office Action, dated Jun. 25, 2015.
U.S. Appl. No. 14/511,712, Notice of Allowance, dated Oct. 22, 2015.
U.S. Appl. No. 14/511,712, Office Action, dated Dec. 26, 2014.
U.S. Appl. No. 14/511,750, Nonfinal Office Action, dated Nov. 3, 2015.
U.S. Appl. No. 14/511,750, Notice of Allowance, dated Mar. 4, 2016.
U.S. Appl. No. 14/528,424, Final Office Action, dated Apr. 22, 2016.
U.S. Appl. No. 14/528,424, Nonfinal Office Action, dated Dec. 3, 2015.
U.S. Appl. No. 14/528,642, Final Office Action, dated Mar. 9, 2016.
U.S. Appl. No. 14/713,184, Final Office Action, dated Jul. 15, 2016.
U.S. Appl. No. 14/713,184, Nonfinal office action, dated Mar. 10, 2017.
U.S. Appl. No. 14/713,184, Nonfinal Office Action, dated Feb. 1, 2016.
U.S. Appl. No. 14/713,188, Final Office Action, dated May 31, 2016.
U.S. Appl. No. 14/713,188, Nonfinal Office Action, dated Dec. 3, 2015.
U.S. Appl. No. 14/713,188, Nonfinal Office Action, dated Feb. 24, 2017.
U.S. Appl. No. 14/713,194, Final Office Action, dated Jan. 25, 2017.
U.S. Appl. No. 14/713,194, Nonfinal Office Action, dated Jul. 29, 2016
U.S. Appl. No. 14/713,201, Final Office Action, dated Sep. 27, 2016.
U.S. Appl. No. 14/713,201, Nonfinal Office Action, dated May 19, 2016.
U.S. Appl. No. 14/713,206, Final Office Action, dated May 13, 2016.
U.S. Appl. No. 14/713,206, Nonfinal Office Action, dated Feb. 13, 2017.
U.S. Appl. No. 14/713,206, Nonfinal Office Action, dated Nov. 20, 2015.
U.S. Appl. No. 14/713,214, Final Office Action, dated Aug. 26, 2016.
U.S. Appl. No. 14/713,214, Nonfinal Office Action, dated Feb. 26, 2016.
U.S. Appl. No. 14/713,217, Final Office Action, dated Jul. 22, 2016.
U.S. Appl. No. 14/713,217, Nonfinal Office Action, dated Mar. 10, 2017.
U.S. Appl. No. 14/713,217, Nonfinal Office Action, dated Feb. 12, 2016.
U.S. Appl. No. 14/713,223, Final Office Action, dated Sep. 1, 2016.
U.S. Appl. No. 14/713,223, Nonfinal Office Action, dated Feb. 26, 2016.
U.S. Appl. No. 14/713,226, Final Office Action, dated May 26, 2016.
U.S. Appl. No. 14/713,226, Nonfinal Office Action, dated Jan. 13, 2016.
U.S. Appl. No. 14/713,226, Notice of Allowance, dated Sep. 22, 2016.
U.S. Appl. No. 14/713,226, Second Notice of Allowance, dated Jan. 12, 2017.
U.S. Appl. No. 14/713,230, Final Office Action, dated Mar. 22, 2016.
U.S. Appl. No. 14/713,230, Nonfinal Office Action, dated Feb. 10, 2017.
U.S. Appl. No. 14/713,237, Final Office Action, dated Sep. 9, 2016.
U.S. Appl. No. 14/713,240, Nonfinal Office Action, dated Apr. 18, 2016.

(56) References Cited

OTHER PUBLICATIONS

U.S. Appl. No. 14/713,240, Final Office Action, dated Sep. 12, 2016.
U.S. Appl. No. 14/713,240, Nonfinal Office Action, dated Apr. 7, 2016.
U.S. Appl. No. 14/713,249, Final Office Action, dated Jul. 12, 2016.
U.S. Appl. No. 14/713,249, Nonfinal Office Action, dated Mar. 7, 2017.
U.S. Appl. No. 14/713,249, Nonfinal Office Action, dated Jan. 20, 2016.
U.S. Appl. No. 14/713,254, Final Office Action, dated Mar. 16, 2016.
U.S. Appl. No. 14/713,254, Nonfinal Office Action, dated Jan. 30, 2017.
U.S. Appl. No. 14/713,261, Final Office Action, dated Apr. 1, 2016.
U.S. Appl. No. 14/713,261, Nonfinal Office Action, dated Feb. 23, 2017.
U.S. Appl. No. 14/713,266, Final Office Action, dated Sep. 12, 2016.
U.S. Appl. No. 14/713,266, Nonfinal Office Action, dated Mar. 23, 2016.
U.S. Appl. No. 14/713,271, Final Office Action, dated Jun. 17, 2016.
U.S. Appl. No. 14/713,271, Nonfinal Office Action, dated Feb. 28, 2017.
U.S. Appl. No. 14/713,271, Nonfinal Office Action, dated Nov. 6, 2015.
U.S. Appl. No. 14/718,338, Notice of Allowance, dated Nov. 2, 2015.
U.S. Appl. No. 14/729,290, Notice of Allowance, dated Aug. 5, 2015.
U.S. Appl. No. 14/798,769, Final Office Action, dated Mar. 14. 2017.
U.S. Appl. No. 14/798,769, Nonfinal Office Action, dated Oct. 6, 2016.
U.S. Appl. No. 14/857,242, Final Office Action, dated Apr. 20, 2016.
U.S. Appl. No. 14/857,242, Nonfinal Office Action, dated Jan. 22, 2016.
U.S. Appl. No. 14/857,242, Notice of Allowance, dated Jul. 1, 2016.
U.S. Appl. No. 14/887,580, Final Office Action, dated Mar. 21, 2017.
U.S. Appl. No. 14/887,580, Nonfinal Office Action, dated Apr. 7, 2016.
U.S. Appl. No. 14/887,580, Nonfinal Office Action, dated Oct. 18, 2016.
U.S. Appl. No. 14/934,347, Nonfinal Office Action, dated Mar. 16, 2017.
U.S. Appl. No. 14/950,492, Final Office Action, dated May 3, 2016.
U.S. Appl. No. 14/950,492, Nonfinal Office Action, dated Jan. 22, 2016.
U.S. Appl. No. 14/950,492, Notice of Allowance, dated Aug. 3, 2016.
U.S. Appl. No. 14/951,798, Nonfinal Office Action, dated Jan. 27, 2017.
U.S. Appl. No. 15/005,498, Nonfinal Office Action, dated Mar. 31, 2016.
U.S. Appl. No. 15/005,498, Notice of Allowance, dated Aug. 2, 2016.
U.S. Appl. No. 15/076,142, Nonfinal Office Action, dated Aug. 9, 2016.
U.S. Appl. No. 15/076,142, Notice of Allowance, dated Sep. 19, 2016.
U.S. Appl. No. 14/255,934, Final Office Action, dated Sep. 23, 2014.
U.S. Appl. No. 14/269,490, Final Office Action, dated Jan. 23, 2015.
Advisory Action dated Apr. 1, 2015 for U.S. Appl. No. 14/269,490, 4 pgs.
Fields et al., U.S. Appl. No. 14/511,750, filed Oct. 10, 2014.
Final Office Action, U.S. Appl. No. 14/255,934, dated Sep. 23, 2014.
Nonfinal Office Action, U.S. Appl. No. 14/255,934, dated Jan. 15, 2015.
Nonfinal Office Action, U.S. Appl. No. 14/255,934, dated Jun. 18, 2014.
Nonfinal Office Action, U.S. Appl. No. 14/269,490, dated Sep. 12, 2014.
Notice of Allowance in U.S. Appl. No. 14/057,408 dated Sep. 25, 2014.
Notice of Allowance in U.S. Appl. No. 14/057,419 dated Oct. 5, 2015.
Notice of Allowance in U.S. Appl. No. 14/208,626 dated May 11, 2015.
Notice of Allowance in U.S. Appl. No. 14/208,626 dated Sep. 1, 2015.
Notice of Allowance in U.S. Appl. No. 14/255,934 dated May 27, 2015.
Notice of Allowance in U.S. Appl. No. 14/729,290 dated Aug. 5, 2015.
Office Action dated Dec. 26, 2014 for U.S. Appl. No. 14/511,712, 21 pgs.
Office Action in U.S. Appl. No. 13/844,090 dated Dec. 4, 2013.
Office Action in U.S. Appl. No. 14/057,419 dated Mar. 31, 2015.
Office Action in U.S. Appl. No. 14/057,419 dated Oct. 9, 2014.
Office Action in U.S. Appl. No. 14/057,456 dated Mar. 17, 2015.
Office Action in U.S. Appl. No. 14/201,491 dated Apr. 29, 2015.
Office Action in U.S. Appl. No. 14/201,491 dated Jan. 16, 2015.
Office Action in U.S. Appl. No. 14/201,491 dated Sep. 11, 2015.
Office Action in U.S. Appl. No. 14/201,491 dated Sep. 26, 2014.
Office Action in U.S. Appl. No. 14/215,789 dated Sep. 17, 2015.
Office Action in U.S. Appl. No. 14/255,934 dated Jan. 15, 2015.
Office Action in U.S. Appl. No. 14/255,934 dated Jun. 18, 2014.
Office Action in U.S. Appl. No. 14/255,934 dated Sep. 23, 2014.
Office Action in U.S. Appl. No. 14/269,490 dated Jan. 23, 2015.
Office Action in U.S. Appl. No. 14/269,490 dated Jun. 11, 2015.
Office Action in U.S. Appl. No. 14/269,490 dated Sep. 12, 2014.
Office Action in U.S. Appl. No. 14/511,712 dated Jun. 25, 2015.
Office Action in U.S. Appl. No. 14/511,712 dated Oct. 10, 2014.
Office Action in U.S. Appl. No. 14/511,750 dated Dec. 19, 2014.
Office Action in U.S. Appl. No. 14/511,750 dated Jun. 30, 2015.
Office Action in U.S. Appl. No. 14/057,408 dated Jan. 28, 2014.
Office Action in U.S. Appl. No. 14/057,408 dated May 22, 2014.
Office Action in U.S. Appl. No. 14/057,419 dated Jan. 28, 2014.
Office Action in U.S. Appl. No. 14/057,419 dated Jun. 18, 2014.
Office Action in U.S. Appl. No. 14/057,435 dated Jul. 23, 2014.
Office Action in U.S. Appl. No. 14/057,435 dated Mar. 20, 2014.
Office Action in U.S. Appl. No. 14/057,435 dated May 29, 2015.
Office Action in U.S. Appl. No. 14/057,435 dated Nov. 18, 2014.
Office Action in U.S. Appl. No. 14/057,447 dated Aug. 28, 2014.
Office Action in U.S. Appl. No. 14/057,447 dated Dec. 18, 2014.
Office Action in U.S. Appl. No. 14/057,447 dated Feb. 24, 2014.
Office Action in U.S. Appl. No. 14/057,447 dated Jul. 6, 2015.
Office Action in U.S. Appl. No. 14/057,456 dated Mar. 14, 2014.
Office Action in U.S. Appl. No. 14/057,456 dated Oct. 28, 2014.
Office Action in U.S. Appl. No. 14/057,467 dated Feb. 23, 2015.
Office Action in U.S. Appl. No. 14/057,467 dated Jan. 27, 2014.
Office Action in U.S. Appl. No. 14/057,467 dated Jun. 11, 2014.
Office Action in U.S. Appl. No. 14/057,467 dated Oct. 17, 2014.
Office Action in U.S. Appl. No. 14/208,626 dated Aug. 29, 2014.
Office Action in U.S. Appl. No. 14/208,626 dated Aug. 13, 2014.
Office Action in U.S. Appl. No. 14/208,626 dated Dec. 23, 2014.
Office Action in U.S. Appl. No. 14/339,652 dated May 15, 2015.
Office Action in U.S. Appl. No. 14/339,652 dated Oct. 23, 2014.
Office Action in U.S. Appl. No. 14/339,652 dated Sep. 24, 2015.
Office Action in U.S. Appl. No. 14/528,424 dated Feb. 27, 2015.
Office Action in U.S. Appl. No. 14/528,424 dated Jul. 30, 2015.
Office Action in U.S. Appl. No. 14/528,642 dated Jan. 13, 2015.
Office Action in U.S. Appl. No. 14/713,230 dated Oct. 9, 2015.
Office Action in U.S. Appl. No. 14/713,254 dated Oct. 9, 2015.
Office Action in U.S. Appl. No. 14/718,338 dated Jul. 7, 2015.
Office Action U.S. Appl. No. 14/713,261, dated Oct. 21, 2015.
Search Report in EP Application No. 13167206.5 dated Aug. 13, 6 pages.

(56) References Cited

OTHER PUBLICATIONS

"Intel Capital to Invest in Future of Automotive Technology", News Release, Intel Corp. (Feb. 29, 2012).
"MIT Spin-off Affectiva Raises $5.7 Million to Commercialize Emotion Technology", Business Wire (Jul. 19, 2011).
Al-Shihabi, Talal et al., "A Framework for Modeling Human-like Driving Behaviors for Autonomous Vehicles in Driving Simulators", Copyright 2001, Northeastern University, 6 pages.
Beard et al., Autonomous vehicle technologies for small fixed-wing UAVs, J. Aerospace Computing Info. Commun. (Jan. 2005).
Biofeedback mobile app, Kurzweill Accelerating Intelligence, downloaded from the Internet at:, http://www.kurzweilai.net/biofeedback-mobile-app> (Feb. 12, 2013).
Birch, Stuart, "Mercedes-Benz' world class driving simulator complex enhances moose safety", Nov. 13, 2010, SAE International, Automobile Engineering (Year: 2010).
Bondarev, Design of an Emotion Management System for a Home Reboot, Koninklijke Philips Electronics NV, 63 pp. (2002).
Bosker, Affectiva's Emotion Recognition Tech: When Machines Know What You're Feeling, www.HuffPost.com (Dec. 24, 2012).
Chan et al., The emotional side of cognitive distraction: implications for road safety, Accident Analysis and Prevention, 50:147-54 (2013).
Cutler, Using The IPhone's Front-Facing Camera, Cardiio Measures Your Heartrate, downloaded from the Internet at: <https://techcrunch.com/2012/08/09/cardiio/> (Aug. 9, 2012).
Davies, Alex, "Here's How Mercedes-Benz Tested Its New Self-Driving Car", Nov. 20, 2012, Business Insider, 4 pages (Year: 2012).
Duffy et al., Sit, Stay, Drive: The Future of Autonomous Car Liability, SMU Science & Technology Law Review, vol. 16, DD. 101-23 (Winter 2013).
Fanke et al., "Autonomous Driving Goes Downtown", IEEE Intelligent Systems. 13, 1998, pp. 40-48.
Filev et al., Future Mobility: Integrating Vehicle Control with Cloud Computing, Mechanical Engineering, 135.3:S18-S24 American Society of Mechanical Engineers (Mar. 2013).
Foo et al., Three-dimensional path planning of unmanned aerial vehicles using particle swarm optimization, Sep. 2006, AIAA.
Funkhouse, Kevin, "Paving the Road Ahead: Autonomous Vehicles, Products Liability, and the Need for a New Approach", Copyright 2013, Issue 1, 2013 Utah L. Rev. 437 2013, 33 pages.
Garza, Andrew P., "Look Ma, No Hands: Wrinkles and Wrecks in the Age of Autonomous Vehicles", 46 New Eng. L. Rev. 581, 616 (2012).
Gerdes et al., Implementable ethics for autonomous vehicles, Chapter 5, In: Maurer et al. (eds.), Autonomes Fahren, Soringer Vieweg, Berlin (2015).
Gleeson, "How much is a monitored alarm insurance deduction?", Demand Media (Oct. 30, 2014).
Goldmark, MIT is making a road frustration index to measure stresses of driving, Fast Company (Jul. 23, 2013).
Graham-Rowe, "A Smart Phone that Knows You're Angry", MIT Technology Review (Jan. 9, 2012).
Gray et al., "A Unified Approach to Threat Assessment and Control for Automotive Active Safety", Sep. 2013, IEEE, vol. 14, No. 3 (Year: 2013).
Grifantini, Sensor detects emotions through the skin, MIT Technology Review (Oct. 26, 2010).
Gurney, Jeffrey K, "Sue My Car Not Me: Products Liability and Accidents Involving Autonomous Vehicles", Nov. 15, 2013, 2013 U. III. J.L. Tech. & Pol'y 247, 31 pages.
Healy, Detecting Stress during Real-world Driving Tasks Using Physiological Sensors, IEEE Trans Intelligent Transportation Systems 6.2:156-66 (2005).
Kluckner et al., Image based building classification and 3D modeling with super-pixels, ISPRS Technical Commission II Symposium, PCV 2010, vol. XXXVIII, part 3A, pp. 233-238 (Sep. 3, 2010).
Kus, Implementation of 3D optical scanning technology for automotive applications, Sensors, 9:1967-79 (2009).
Laine et al., Behavioral triggers of skin conductance responses and their neural correlates in the primate amyadala, J. Neurophysiol., 101:1749-54 (2009).
Lattner et al., "Knowledge-based risk assessment for intelligent vehicles", IEEE KIMAS, Apr. 18-21, 2005, Waltham, Massachusetts (Apr. 2005), pp. 191-196.
Lee et al., What is stressful on the road? Analysis on aggression-inducing traffic situations through self-report, Proceedings of the Human Factors and Ergonomics Society Annual Meeting, 57(1):1500-1503 (Sep. 2013).
Lewis, The History of Driverless Cars, downloaded from the Internet at: <www.thefactsite.com/2017/06/driverless-cars-history.html> (Jun. 2017).
Lomas, Can an algorithm be empathetic? UK startup El technologies is building software that's sensitive to tone of voice, downloaded from the Internet at: https://techcrunch.com/2013/08/04/empathy/ (Aug. 4, 2013).
Marchant et al., The coming collision between autonomous vehicles and the liability system, Santa Clara Law Review, 52(4): Article 6 (2012).
Mercedes-Benz, "Press Information", Nov. 2012, Mercedes-Benz Driving Simulator (Year; 2012).
Merz et al., Beyond Visual Range Obstacle Avoidance and Infrastructure Inspection by an Autonomous Helicopter, Sep. 2011, IEEE.
Murph, Affectiva's Q Sensor Wristband Monitors and Logs Stress Levels, Might Bring Back the Snap Bracelet, Engadget.com (Nov. 2, 2010).
Nasoz et al., Emotion recognition from physiological signals using wireless sensors for presence technologies, Cogn. Tech. Work, 6:4-14 (2004).
Nass et al., Improving automotive safety by pairing driver emotion and car voice emotion. CHI 2005 Late Breaking Results: Short Papers, Portland, Oregon (Apr. 2-7 2005).
Peterson, Robert W., "New Technology—Old Law: Autonomous Vehicles and California's Insurance Framework", Dec. 18, 2012, Santa Clara Law Review, vol. 52, No. 4, Article 7, 60 pages.
Philipson, Want to drive safely? Listen to Elton John, Aerosmith or S Club 7, The Telegraph (Jan. 8, 2013).
Pohanka et al., Sensors simulation environment for sensor data fusion, 14th International Conference on Information Fusion, Chicaao, IL, pp. 1-8 (2011).
Private Ownership Costs, RACO, Wayback Machine, http://www.racq.com.au:80/-/media/pdf/racqpdfs/cardsanddriving/cars/0714_vehicle_running_cost s.ashx/ (Oct. 6, 2014).
Saberi et al. "An Approach for Functional Safety Improvement of an Existing Automotive System" IEEE, 6 pages. (Year 2015).
Sepulcre et al., Cooperative vehicle-to-vehicle active safety testing under challenging conditions, Transportation Research Part C, 26:233-55 (2013).
Shaya, "For Some, Driving Is More Stressful than Skydiving." AutomotiveNews.com. Automotive News, Jun. 12, 2013.
Sorrel, App Measures Vital Signs Using IPad Camera, wired.com (Nov. 18, 2011).
Talbot, "Wrist Sensor Tells You How Stressed Out You Are", MIT Technology Review (Dec. 20, 2012).
Tiberkak et al., An architecture for policy-based home automation system (PBHAS), 2010 IEEE Green Technologies Conference (Apr. 15-16, 2010).
Toor, Valve looks to sweat levels and eye controls for future game design, downloaded from the Internet at: https://www.theverge.com/2013/5/7/4307750/valve-biometric-eye-tracking-sweat-left-4-dead-portal-2 (May 7, 2013).
UTC Spotlight: Superstorm Sandy LiDAR Damage Assessment to Change Disaster Recovery, Feb. 2013.
"Smartphone-Based Measurement Systems for Road Vehicle Traffic Monitoring and Usage-Based Insurance," by Peter Handel, Jens Ohlsson, Martin Ohlsson, Isaac Skog and Elin Nygren. IEEE Systems Journal, vol. 8, No. 4. Dec. 2014 (Year: 2014).
U.S. Appl. No. 14/428,424, filed Oct. 30, 2014, Christensen et al.
U.S. Appl. No. 14/528,642, filed Oct. 30, 2014, Christensen et al.
U.S. Appl. No. 14/713,217, filed May 15, 2015, Konrardy et al.

(56) References Cited

OTHER PUBLICATIONS

"Driverless Cars . . . The Future is Already Here", AutoInsureace Center, downloaded from the Internet at: https://www.autoinsurancecenter.com/driverless-cars...the-future-is-already-here.htm>, downloaded Feb. 7, 2020; 9 pages.

"Integrated Vehicle-Based Safety Systems (IVBSS)", Research and Innovative Technology Administration (RITA), downloaded from the Internet at: <https://www.its.dot.gov/research_archives/ivbs/index.htm>, downloaded Feb. 7, 2020; 3 pages.

Carrol, Paul B. et al., "Where Innovation Is Sorely Needed", MIT Technology Review, Feb. 1, 2011; downloaded from the Internet at <https://www.technologyreview.com/s/422568/where-innovation-is-sorely-needed/>; downloaded on Feb. 7, 2020; 5 pages.

Davies, "Aviding Squirrels and Other Things Goodle's Robot Car Can't Do"; downloaded from the Internet at https://www.wired.com/2014/05/google-self-driving-car-can-cant/>; downloaded on Feb. 7, 2020; 4 pages.

Levendusky, Jim et al., "Advancements in automotive technology and their effect on personal auto insurance". ; downloaded from the Internet at <https://www.verisk.com/visualize/advancements-in-automotive-technology-and-their-effect>; (2013); 3 pages.

McCraty, Rollin, et al., "The Effects of Differenct Types of Music on Mood, Tension, and Mental Clarity", Alternative Therapies, Jan. 1998, vol. 4, No. 1; 10 pages.

Mui, Chunka, "Will Auto Insurers Survive Their Collision with Driverless Cars? (Part 6)", downloaded from the Internet at <https://www.forbes.com/sites/chunkamui/2013/03/28/will-auto-insurers-survive-their-collision>; downloaded Feb. 7, 2020; 8 pages.

Read, Richard, "Autonomous Cars & The Death Of Auto Insurance"; downloaded from the Internet at <https://www.thecarconnection.com/news/1083266_autonomous-cars-the-death-of-auto-insurance>, downloaded Feb. 7, 2020; 4 pages.

Sharma, Aroma, "Driving the Future: The Legal Implications of Autonomous Vehicles" Conference Recap; downloaded from the Internet at <https://law.scu.edu/hightech/autonomousvehicleconfrecap2012>; (2012); 4 pages.

Stienstra, Mike, "Autonomous Vehicles & the Insurance Industry", 2013 CAS Annual Meeting—Minneapolis, MN (2013); 13 pages.

Wiesenthal, David L., et al., "The Influence of Music on Driver Stress"; Journal of Applied Social Psychology, Jul. 7, 2000; 7 pages.

Young, Chung-Ping et al., "Cooperative Collision Warning Based Highway Vehicle Accident Reconstruction", Eighth International Conference on Intelligent Systems Design and Applications, Nov. 26-28, 2008; 5 pages.

Hancock, G.M., et al., "The impact of emotions and predominant emotion regulation technique on driving performance", IOS Press; (2012); 4 pages.

Vasudevan et al., Safe semi-autonomous control with enhanced driver modeling, 2012 American Control Conference, Fairmont Queen Elizabeth, Montreal, Canada (Jun. 27-29, 2012).

Villasenor, Products liability and driverless cars: Issues and guiding principles for legislation, Brookinas Center for Technoloav Innovation, 25 paaes (Apr. 2014).

Wang et al., Shader-based sensor simulation for autonomous car testing, 15th International IEEE Conference on Intelligent Transportation Systems, Anchorage, Alaska, pp. 224-229 (2012).

Wardzinski, "Dynamic risk assessment in autonomous vehicles motion planning", Proceedings of the 2008 1st International Conference on Information Technology, IT 2008, Gdansk, Poland (May 19-21, 2008).

Woodbeck et al., "Visual cortex on the GPU: Biologically inspired classifier and feature descriptor for rapid recognition", Jun. 28, 2008, IEEE Computer Society Conf. on Computer Vision and Pattern Recognition Workshops 2008, p. 1-8.

* cited by examiner

METHODS OF FACILITATING EMERGENCY ASSISTANCE

CROSS-REFERENCE TO RELATED APPLICATIONS

This application is a continuation of, and claims the benefit of, U.S. patent application Ser. No. 15/676,470, entitled "Methods of Facilitating Emergency Assistance" and filed Aug. 14, 2017, which is a continuation of U.S. patent application Ser. No. 14/798,757, filed Jul. 14, 2015 (now U.S. Pat. No. 9,786,154), which claims the benefit of U.S. Provisional Application No. 62/027,021 (filed Jul. 21, 2014); U.S. Provisional Application No. 62/040,735 (filed Aug. 22, 2014); U.S. Provisional Application No. 62/145,022 (filed Apr. 9, 2015); U.S. Provisional Application No. 62/145,024 (filed Apr. 9, 2015); U.S. Provisional Application No. 62/145,027 (filed Apr. 9, 2015); U.S. Provisional Application No. 62/145,028 (filed Apr. 9, 2015); U.S. Provisional Application No. 62/145,029 (filed Apr. 9, 2015); U.S. Provisional Application No. 62/145,032 (filed Apr. 9, 2015); U.S. Provisional Application No. 62/145,033 (filed Apr. 9, 2015); U.S. Provisional Application No. 62/145,145 (filed Apr. 9, 2015); U.S. Provisional Application No. 62/145,228 (filed Apr. 9, 2015); U.S. Provisional Application No. 62/145,232 (filed Apr. 9, 2015); and U.S. Provisional Application No. 62/145,234 (filed Apr. 9, 2015). The entirety of each of the foregoing applications is incorporated by reference herein.

Additionally, the present application is related to co-pending U.S. patent application Ser. No. 14/798,741 (filed Jul. 14, 2015); co-pending U.S. patent application Ser. No. 14/798,750 (filed Jul. 14, 2015); co-pending U.S. patent application Ser. No. 14/798,745 (filed Jul. 14, 2015); co-pending U.S. patent application Ser. No. 14/798,763 (filed Jul. 14, 2015); co-pending U.S. patent application Ser. No. 14/798,609 (filed Jul. 14, 2015); co-pending U.S. patent application Ser. No. 14/798,615 (filed Jul. 14, 2015); co-pending U.S. patent application Ser. No. 14/798,626 (filed Jul. 14, 2015); co-pending U.S. patent application Ser. No. 14/798,633 (filed Jul. 14, 2015); co-pending U.S. patent application Ser. No. 14/798,769 (filed Jul. 14, 2015); and co-pending U.S. patent application Ser. No. 14/798,770 (filed Jul. 14, 2015).

FIELD

The present embodiments relate generally to telematics data and/or insurance policies. More particularly, the present embodiments relate to performing certain actions, and/or adjusting insurance policies, based upon telematics and/or other data indicative of risk or insured behavior.

BACKGROUND

At times, insurance providers are able to provide helpful information to customers who have recently been in an accident. When a customer calls a claims associate to report an accident and initiate a claim, for example, the associate may be able to offer suggestions with respect to the next steps that the customer should take. Often, however, customers do not call their insurance providers promptly after an accident, and/or it takes a significant amount of time for the associate to locate and relay useful information. Moreover, in an emergency situation (e.g., a serious car accident), a claim associate may be very limited in his or her ability to provide assistance. In such a situation, the customer may be unable to contact a claim associate and, more importantly, may be unable to contact emergency services/responders.

The present embodiments may overcome these and/or other deficiencies.

BRIEF SUMMARY

The present embodiments disclose systems and methods that may relate to the intersection of telematics and insurance. In some embodiments, for example, telematics and/or other data may be collected and used to determine a likely severity of a vehicle accident. The data may be gathered from one or more sources, such as mobile devices (e.g., smart phones, smart glasses, smart watches, smart wearable devices, smart contact lenses, and/or other devices capable of wireless communication); smart vehicles; smart vehicle or smart home mounted sensors; third party sensors or sources of data (e.g., other vehicles, public transportation systems, government entities, and/or the Internet); and/or other sources of information. Based upon the likely severity, a communication related to emergency assistance or an emergency assistance request may be generated. The communication may be sent to a driver involved in the accident (e.g., for approval, rejection or modification prior to being sent to an emergency service provider), and/or sent directly to an emergency service provider, for example.

In one aspect, a computer-implemented method of loss mitigation may include (1) collecting, by one or more remote servers associated with an insurance provider, accident data associated with a vehicle accident involving a driver. The accident data may include vehicle telematics data, and/or the driver may be associated with an insurance policy issued by the insurance provider. The method may also include (2) analyzing, by the one or more remote servers, the accident data; (3) determining, by the one or more remote servers and based upon the analysis of the accident data, a likely severity of the vehicle accident; (4) generating, by the one or more remote servers and based upon the determined likely severity of the vehicle accident, a communication related to emergency assistance or an emergency assistance recommendation; (5) transmitting, via wireless communication, the communication related to the emergency assistance or emergency assistance recommendation from the one or more remote servers to a mobile device associated with the driver; (6) receiving, at the one or more remote servers, a wireless communication from the driver indicating approval or modification of the emergency assistance or emergency assistance recommendation; and/or (7) notifying, via a communication sent from the one or more remote servers, a third party of requested emergency assistance in accordance with the emergency assistance or emergency assistance recommendation as approved or modified by the driver. The method may include additional, fewer, or alternate actions, including those discussed elsewhere herein.

In another aspect, a computer-implemented method of loss mitigation may include (1) collecting, by one or more remote servers associated with an insurance provider, accident data associated with a vehicle accident involving a driver. The accident data may include vehicle telematics data, and/or the driver may be associated with an insurance policy issued by the insurance provider. The method may also include (2) analyzing, by the one or more remote servers, the accident data; (3) determining, by the one or more remote servers and based upon the analysis of the accident data, a likely severity of the vehicle accident; (4) generating, by the one or more remote servers and based upon the determined likely severity of the vehicle accident, a communication related to emergency assistance or an emergency assistance recommendation; and/or (5) transmitting the communication related to the emergency assistance or emergency assistance recommendation from the one or more remote servers to a third party to facilitate a prompt and appropriate emergency responder response to the vehicle accident. The method may include additional, fewer, or alternate actions, including those discussed elsewhere herein.

In another aspect, a system for facilitating loss mitigation may include one or more processors and one or more memories. The one or more memories may store instructions that, when executed by the one or more processors, cause the one or more processors to (1) collect accident data associated with a vehicle accident involving a driver. The accident data may include vehicle telematics data, and/or the driver may be associated with an insurance policy issued by the insurance provider. The instructions may also cause the one or more processors to (2) analyze the accident data; (3) determine, based upon the analysis of the accident data, a likely severity of the vehicle accident; (4) generate, based upon the determined likely severity of the vehicle accident, a communication related to emergency assistance or an emergency assistance recommendation; (5) cause the communication related to the emergency assistance or emergency assistance recommendation to be transmitted, via wireless communication, to a mobile device associated with the driver; (6) receive a wireless communication from the driver indicating approval or modification of the emergency assistance or emergency assistance recommendation; and/or (7) cause a third party to be notified of requested emergency assistance in accordance with the emergency assistance or emergency assistance recommendation as approved or modified by the driver.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

There are shown in the drawings arrangements which are presently discussed. It is understood, however, that the present embodiments are not limited to the precise arrangements and instrumentalities shown.

DETAILED DESCRIPTION

The present embodiments may relate to, inter alia, collecting data, including telematics and/or other data, and analyzing the data (e.g., by an insurance provider server or processor) to provide insurance-related benefits to insured individuals, and/or to apply the insurance-related benefits to insurance policies or premiums of insured individuals. For example, the insurance-related benefits may include risk or loss mitigation and/or prevention, and/or may include theft protection, mitigation, and/or avoidance. The insurance-related benefits may also, or instead, include other products and/or services, such as intelligent vehicle routing in real-time, for example. The present embodiments may prevent losses/injury/damage to persons and/or property, and/or reward an insured for exhibiting risk-averse behavior (e.g., in the form of lower insurance premiums or rates, or additional insurance discounts, points, and/or rewards).

I. Exemplary Telematics Data System

Figure 1:
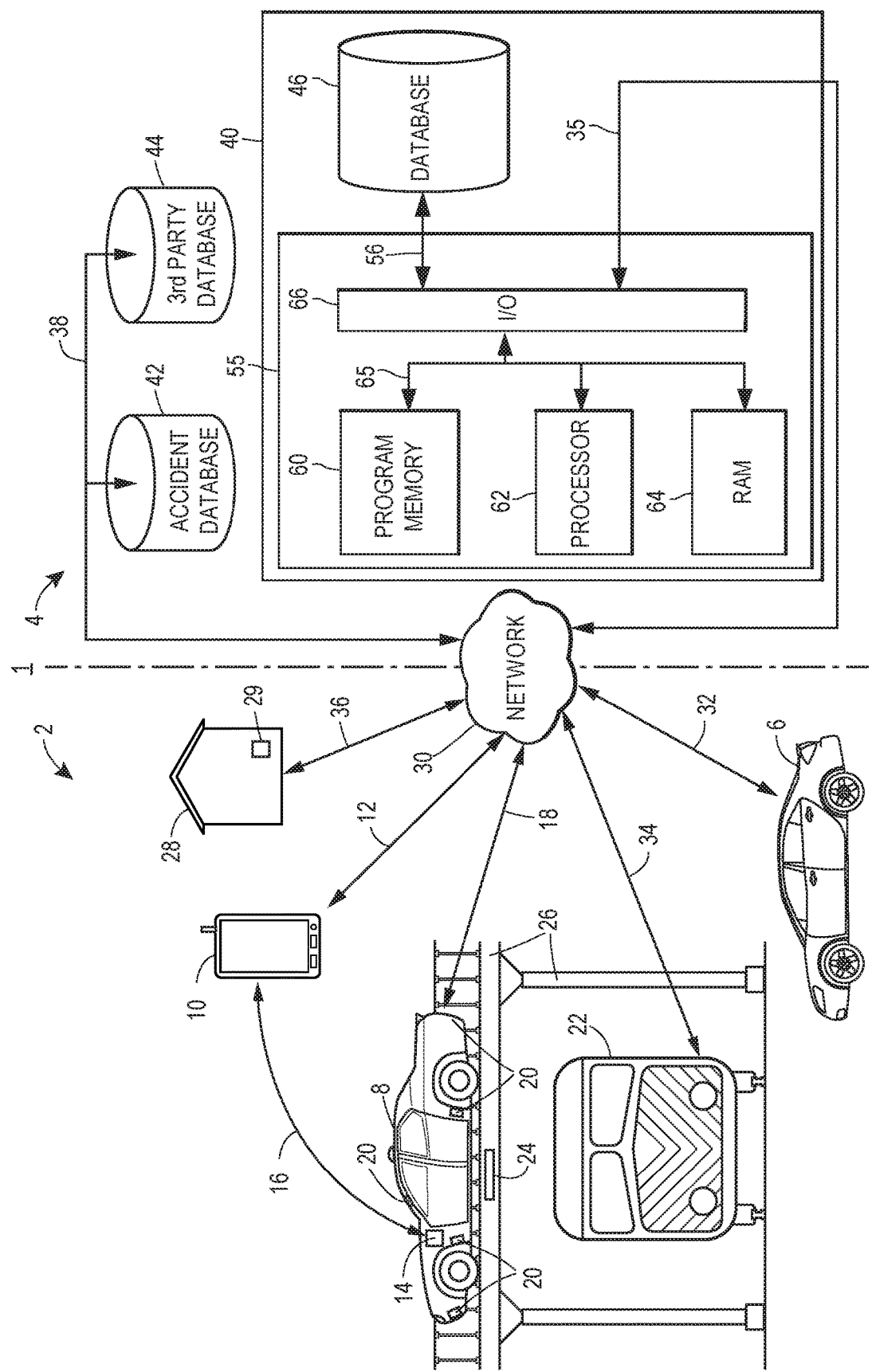
FIG. 1 illustrates an exemplary computer system on which the techniques described herein may be implemented, according to one embodiment.

FIG. 1 illustrates a block diagram of an exemplary telematics system 1 on which the exemplary methods described herein may be implemented. The high-level architecture includes both hardware and software applications, as well as various data communications channels for communicating data between the various hardware and software components. The telematics system 1 may be roughly divided into front-end components 2 and back-end components 4.

The front-end components 2 may obtain information regarding a vehicle 8 (e.g., a car, truck, motorcycle, etc.) and/or the surrounding environment. Information regarding the surrounding environment may be obtained by one or more other vehicles 6, public transportation system components 22 (e.g., a train, a bus, a trolley, a ferry, etc.), infrastructure components 26 (e.g., a bridge, a stoplight, a tunnel, a rail crossing, etc.), smart homes 28 having smart home controllers 29, and/or other components communicatively connected to a network 30. Information regarding the vehicle 8 may be obtained by a mobile device 10 (e.g., a smart phone, a tablet computer, a special purpose computing device, etc.) and/or a smart vehicle controller 14 (e.g., an on-board computer, a vehicle diagnostic system, a vehicle control system or sub-system, etc.), which may be communicatively connected to each other and/or the network 30.

In some embodiments, telematics data may be generated by and/or received from sensors 20 associated with the vehicle 8. Such telematics data from the sensors 20 may be received by the mobile device 10 and/or the smart vehicle controller 14, in some embodiments. Other, external sensors 24 (e.g., sensors associated with one or more other vehicles 6, public transportation system components 22, infrastructure components 26, and/or smart homes 28) may provide further data regarding the vehicle 8 and/or its environment, in some embodiments. For example, the external sensors 24 may obtain information pertaining to other transportation components or systems within the environment of the vehicle 8, and/or information pertaining to other aspect so of that environment. The sensors 20 and the external sensors 24 are described further below, according to some embodiments.

In some embodiments, the mobile device 10 and/or the smart vehicle controller 14 may process the sensor data from sensors 20, and/or other of the front-end components 2 may process the sensor data from external sensors 24. The processed data (and/or information derived therefrom) may then be communicated to the back-end components 4 via the network 30. In other embodiments, the front-end components 2 may communicate the raw sensor data from sensors 20 and/or external sensors 24, and/or other telematics data, to the back-end components 4 for processing. In thin-client embodiments, for example, the mobile device 10 and/or the smart vehicle controller 14 may act as a pass-through communication node for communication with the back-end components 4, with minimal or no processing performed by the mobile device 10 and/or the smart vehicle controller 14. In other embodiments, the mobile device 10 and/or the smart vehicle controller 14 may perform substantial processing of received sensor, telematics, or other data. Summary information, processed data, and/or unprocessed data may be communicated to the back-end components 4 via the network 30.

The mobile device 10 may be a general-use personal computer, cellular phone, smart phone, tablet computer, or a dedicated vehicle use monitoring device. In some embodiments, the mobile device 10 may include a wearable device such as a smart watch, smart glasses, wearable smart technology, or a pager. Although only one mobile device 10 is illustrated, it should be understood that a plurality of mobile devices may be used in some embodiments. The smart vehicle controller 14 may be a general-use on-board computer capable of performing many functions relating to vehicle operation, an on-board computer system or subsystem, or a dedicated computer for monitoring vehicle operation and/or generating telematics data. Further, the smart vehicle controller 14 may be installed by the manufacturer of the vehicle 8 or as an aftermarket modification or addition to the vehicle 8. Either or both of the mobile device 10 and the smart vehicle controller 14 may communicate with the network 30 over link 12 and link 18, respectively. Additionally, the mobile device 10 and smart vehicle controller 14 may communicate with one another directly over link 16. In some embodiments, the mobile device 10 and/or the smart vehicle controller 14 may communicate with other of the front-end components 2, such as the vehicles 6, public transit system components 22, infrastructure components 26, and/or smart homes 28, either directly or indirectly (e.g., via the network 30).

The one or more sensors 20 referenced above may be removably or fixedly disposed within (and/or on the exterior of) the vehicle 8, within the mobile device 10, and/or within the smart vehicle controller 14, for example. The sensors 20 may include any one or more of various different sensor types, such as an ignition sensor, an odometer, a system clock, a speedometer, a tachometer, an accelerometer, a gyroscope, a compass, a geolocation unit (e.g., a GPS unit), a camera and/or video camera, a distance sensor (e.g., radar, LIDAR, etc.), and/or any other sensor or component capable of generating or receiving data regarding the vehicle 8 and/or the environment in which the vehicle 8 is located.

Some of the sensors 20 (e.g., radar, LIDAR, ultrasonic, infrared, or camera units) may actively or passively scan the vehicle environment for objects (e.g., other vehicles, buildings, pedestrians, etc.), traffic control elements (e.g., lane markings, signs, signals, etc.), external conditions (e.g., weather conditions, traffic conditions, road conditions, etc.), and/or other physical characteristics of the environment. Other sensors of sensors 20 (e.g., GPS, accelerometer, or tachometer units) may provide operational and/or other data for determining the location and/or movement of the vehicle 8. Still other sensors of sensors 20 may be directed to the interior or passenger compartment of the vehicle 8, such as cameras, microphones, pressure sensors, thermometers, or similar sensors to monitor the vehicle operator and/or passengers within the vehicle 8.

The external sensors 24 may be disposed on or within other devices or components within the vehicle's environment (e.g., other vehicles 6, infrastructure components 26, etc.), and may include any of the types of sensors listed above. For example, the external sensors 24 may include sensors that are the same as or similar to sensors 20, but disposed on or within some of the vehicles 6 rather than the vehicle 8.

To send and receive information, each of the sensors 20 and/or external sensors 24 may include a transmitter and/or a receiver designed to operate according to predetermined specifications, such as the dedicated short-range communication (DSRC) channel, wireless telephony, Wi-Fi, or other existing or later-developed communications protocols. As used herein, the terms "sensor" or "sensors" may refer to the sensors 20 and/or external sensors 24.

The other vehicles 6, public transportation system components 22, infrastructure components 26, and/or smart homes 28 may be referred to herein as "external" data sources. The other vehicles 6 may include any other vehicles, including smart vehicles, vehicles with telematics-capable mobile devices, autonomous vehicles, and/or other vehicles communicatively connected to the network 30 via links 32.

The public transportation system components 22 may include bus, train, ferry, ship, airline, and/or other public transportation system components. Such components may include vehicles, tracks, switches, access points (e.g., turnstiles, entry gates, ticket counters, etc.), and/or payment locations (e.g., ticket windows, fare card vending machines, electronic payment devices operated by conductors or passengers, etc.), for example. The public transportation system components 22 may further be communicatively connected to the network 30 via a link 34, in some embodiments.

The infrastructure components 26 may include smart infrastructure or devices (e.g., sensors, transmitters, etc.) disposed within or communicatively connected to transportation or other infrastructure, such as roads, bridges, viaducts, terminals, stations, fueling stations, traffic control devices (e.g., traffic lights, toll booths, entry ramp traffic regulators, crossing gates, speed radar, cameras, etc.), bicycle docks, footpaths, or other infrastructure system components. In some embodiments, the infrastructure components 26 may be communicatively connected to the network 30 via a link (not shown in FIG. 1).

The smart homes 28 may include dwellings or other buildings that generate or collect data regarding their condition, occupancy, proximity to a mobile device 10 or vehicle 8, and/or other information. The smart homes 28 may include smart home controllers 29 that monitor the local environment of the smart home, which may include sensors (e.g., smoke detectors, radon detectors, door sensors, window sensors, motion sensors, cameras, etc.). In some embodiments, the smart home controller 29 may include or be communicatively connected to a security system controller for monitoring access and activity within the environment. The smart home 28 may further be communicatively connected to the network 30 via a link 36, in some embodiments.

The external data sources may collect data regarding the vehicle 8, a vehicle operator, a user of an insurance program, and/or an insured of an insurance policy. Additionally, or alternatively, the other vehicles 6, the public transportation system components 22, the infrastructure components 26, and/or the smart homes 28 may collect such data, and provide that data to the mobile device 10 and/or the smart vehicle controller 14 via links not shown in FIG. 1.

In some embodiments, the front-end components 2 communicate with the back-end components 4 via the network 30. The network 30 may include a proprietary network, a secure public internet, a virtual private network and/or one or more other types of networks, such as dedicated access lines, plain ordinary telephone lines, satellite links, cellular data networks, or combinations thereof. In embodiments where the network 30 comprises the Internet, data communications may take place over the network 30 via an Internet communication protocol.

The back-end components 4 may use a remote server 40 to receive data from the front-end components 2, determine characteristics of vehicle use, determine risk levels, modify insurance policies, and/or perform other processing functions in accordance with any of the methods described herein. In some embodiments, the server 40 may be associated with an insurance provider, either directly or indirectly. The server 40 may include one or more computer processors adapted and configured to execute various software applications and components of the telematics system 1.

The server 40 may further include a database 46, which may be adapted to store data related to the operation of the vehicle 8 and/or other information. As used herein, the term "database" may refer to a single database or other structured data storage, or to a collection of two or more different databases or structured data storage components. Additionally, the server 40 may be communicatively coupled via the network 30 to one or more data sources, which may include an accident database 42 and/or a third party database 44. The accident database 42 and/or third party database 44 may be communicatively connected to the network via a communication link 38. The accident database 42 and/or the third party database 44 may be operated or maintained by third parties, such as commercial vendors, governmental entities, industry associations, nonprofit organizations, or others.

The data stored in the database 46 might include, for example, dates and times of vehicle use, duration of vehicle use, speed of the vehicle 8, RPM or other tachometer readings of the vehicle 8, lateral and longitudinal acceleration of the vehicle 8, incidents or near-collisions of the vehicle 8, communications between the vehicle 8 and external sources (e.g., other vehicles 6, public transportation system components 22, infrastructure components 26, smart homes 28, and/or external information sources communicating through the network 30), environmental conditions of vehicle operation (e.g., weather, traffic, road condition, etc.), errors or failures of vehicle features, and/or other data relating to use of the vehicle 8 and/or the vehicle operator. Prior to storage in the database 46, some of the data may have been uploaded to the server 40 via the network 30 from the mobile device 10 and/or the smart vehicle controller 14. Additionally, or alternatively, some of the data may have been obtained from additional or external data sources via the network 30. Additionally, or alternatively, some of the data may have been generated by the server 40. The server 40 may store data in the database 46 and/or may access data stored in the database 46 when executing various functions and tasks associated with the methods described herein.

The server 40 may include a controller 55 that is operatively connected to the database 46 via a link 56. It should be noted that, while not shown in FIG. 1, one or more additional databases may be linked to the controller 55 in a known manner. For example, separate databases may be used for sensor data, vehicle insurance policy information, and vehicle use information. The controller 55 may include a program memory 60, a processor 62 (which may be called a microcontroller or a microprocessor), a random-access memory (RAM) 64, and an input/output (I/O) circuit 66, all of which may be interconnected via an address/data bus 65. It should be appreciated that although only one microprocessor 62 is shown, the controller 55 may include multiple microprocessors 62. Similarly, the memory of the controller 55 may include multiple RAMs 64 and multiple program memories 60. Although the I/O circuit 66 is shown as a single block, it should be appreciated that the I/O circuit 66 may include a number of different types of I/O circuits. The RAM 64 and program memories 60 may be implemented as semiconductor memories, magnetically readable memories, or optically readable memories, for example. The controller 55 may also be operatively connected to the network 30 via a link 35.

The server 40 may further include a number of software applications stored in a program memory 60. The various software applications on the server 40 may include specific programs, routines, or scripts for performing processing functions associated with the methods described herein. Additionally, or alternatively, the various software application on the server 40 may include general-purpose software applications for data processing, database management, data analysis, network communication, web server operation, or other functions described herein or typically performed by a server. The various software applications may be executed on the same computer processor or on different computer processors. Additionally, or alternatively, the software applications may interact with various hardware modules that may be installed within or connected to the server 40. Such modules may implement part of all of the various exemplary methods discussed herein or other related embodiments.

In some embodiments, the server 40 may be a remote server associated with or operated by or on behalf of an insurance provider. The server 40 may be configured to receive, collect, and/or analyze telematics and/or other data in accordance with any of the methods described herein. The server 40 may be configured for one-way or two-way wired or wireless communication via the network 30 with a number of telematics and/or other data sources, including the accident database 42, the third party database 44, the database 46 and/or the front-end components 2. For example, the server 40 may be in wireless communication with mobile device 10; insured smart vehicles 8; smart vehicles of other motorists 6; smart homes 28; present or past accident database 42; third party database 44 operated by one or more government entities and/or others; public transportation system components 22 and/or databases associated therewith; smart infrastructure components 26; and/or the Internet. The server 40 may be in wired or wireless communications with other sources of data, including those discussed elsewhere herein.

Although the telematics system 1 is shown in FIG. 1 to include one vehicle 8, one mobile device 10, one smart vehicle controller 14, one other vehicle 6, one public transportation system component 22, one infrastructure component 26, one smart home 28, and one server 40, it should be understood that different numbers of each may be utilized. For example, the system 1 may include a plurality of servers 40 and hundreds or thousands of mobile devices 10 and/or smart vehicle controllers 14, all of which may be interconnected via the network 30. Furthermore, the database storage or processing performed by the server 40 may be distributed among a plurality of servers in an arrangement known as "cloud computing." This configuration may provide various advantages, such as enabling near real-time uploads and downloads of information as well as periodic uploads and downloads of information. This may in turn support a thin-client embodiment of the mobile device 10 or smart vehicle controller 14 discussed herein.

Figure 2:
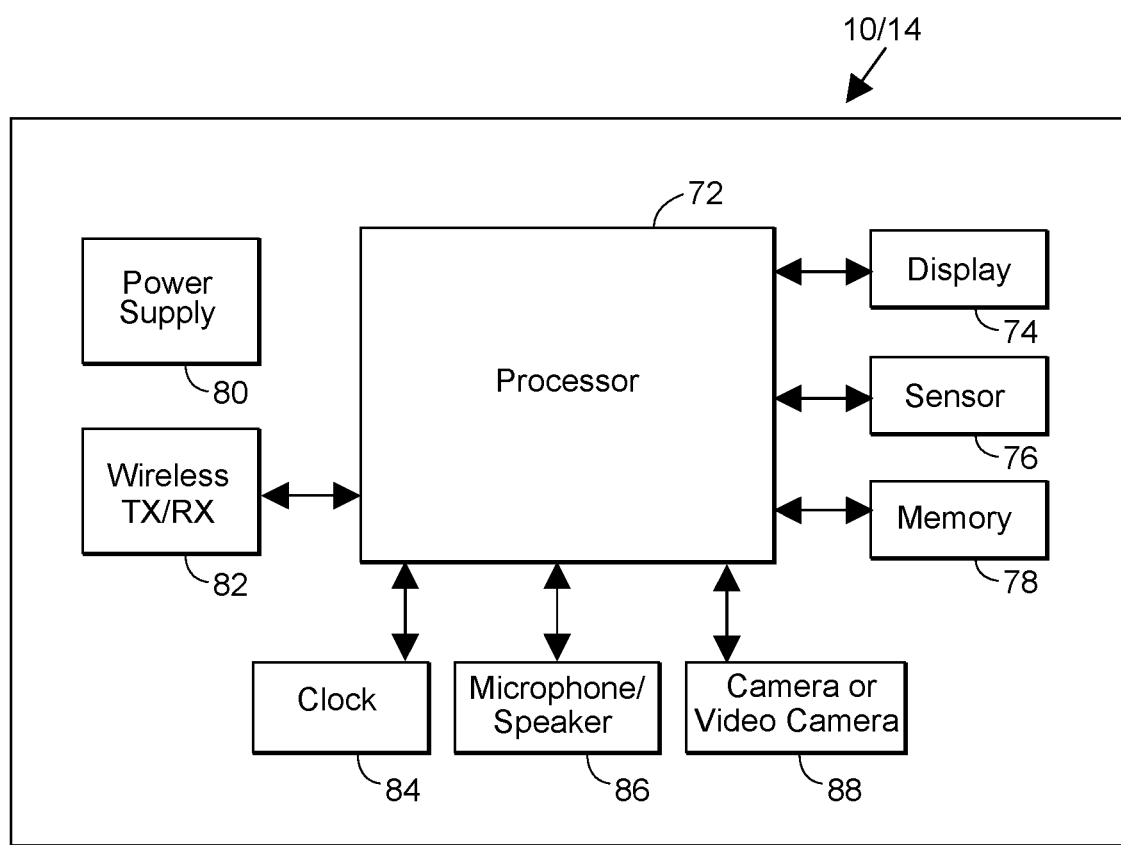
FIG. 2 illustrates an exemplary mobile device or smart vehicle controller that may collect, receive, generate and/or send telematics and/or other data for purposes of the techniques described herein, according to one embodiment.

FIG. 2 illustrates a block diagram of an exemplary mobile device 10 and/or smart vehicle controller 14. The mobile device 10 and/or smart vehicle controller 14 may include a processor 72, display 74, sensor 76, memory 78, power supply 80, wireless radio frequency transceiver 82, clock 84, microphone and/or speaker 86, and/or camera or video camera 88. In other embodiments, the mobile device and/or smart vehicle controller may include additional, fewer, and/or alternate components.

The sensor 76 may be able to record audio or visual information. If FIG. 2 corresponds to the mobile device 10, for example, the sensor 76 may be a camera integrated within the mobile device 10. The sensor 76 may alternatively be configured to sense speed, acceleration, directional, fluid, water, moisture, temperature, fire, smoke, wind, rain, snow, hail, motion, and/or other type of condition or parameter, and/or may include a gyro, compass, accelerometer, or any other type of sensor described herein (e.g., any of the sensors 20 described above in connection with FIG. 1). Generally, the sensor 76 may be any type of sensor that is currently existing or hereafter developed and is capable of providing information regarding the vehicle 8, the environment of the vehicle 8, and/or a person.

The memory 78 may include software applications that control the mobile device 10 and/or smart vehicle controller 14, and/or control the display 74 configured for accepting user input. The memory 78 may include instructions for controlling or directing the operation of vehicle equipment that may prevent, detect, and/or mitigate vehicle damage. The memory 78 may further include instructions for controlling a wireless or wired network of a smart vehicle, and/or interacting with mobile device 10 and remote server 40 (e.g., via the network 30).

The power supply 80 may be a battery or dedicated energy generator that powers the mobile device 10 and/or smart vehicle controller 14. The power supply 80 may harvest energy from the vehicle environment and be partially or completely energy self-sufficient, for example.

The transceiver 82 may be configured for wireless communication with sensors 20 located about the vehicle 8, other vehicles 6, other mobile devices similar to mobile device 10, and/or other smart vehicle controllers similar to smart vehicle controller 14. Additionally, or alternatively, the transceiver 82 may be configured for wireless communication with the server 40, which may be remotely located at an insurance provider location.

The clock 84 may be used to time-stamp the date and time that information is gathered or sensed by various sensors. For example, the clock 84 may record the time and date that photographs are taken by the camera 88, video is captured by the camera 88, and/or other data is received by the mobile device 10 and/or smart vehicle controller 14.

The microphone and speaker 86 may be configured for recognizing voice or audio input and/or commands. The clock 84 may record the time and date that various sounds are collected by the microphone and speaker 86, such as sounds of windows breaking, air bags deploying, tires skidding, conversations or voices of passengers, music within the vehicle 8, rain or wind noise, and/or other sound heard within or outside of the vehicle 8.

The present embodiments may be implemented without changes or extensions to existing communications standards. The smart vehicle controller 14 may also include a relay, node, access point, Wi-Fi AP (Access Point), local node, pico-node, relay node, and/or the mobile device 10 may be capable of RF (Radio Frequency) communication, for example. The mobile device 10 and/or smart vehicle controller 14 may include Wi-Fi, Bluetooth, GSM (Global System for Mobile communications), LTE (Long Term Evolution), CDMA (Code Division Multiple Access), UMTS (Universal Mobile Telecommunications System), and/or other types of components and functionality.

II. Telematics Data

Telematics data, as used herein, may include telematics data, and/or other types of data that have not been conventionally viewed as "telematics data." The telematics data may be generated by, and/or collected or received from, various sources. For example, the data may include, indicate, and/or relate to vehicle (and/or mobile device) speed; acceleration; braking; deceleration; turning; time; GPS (Global Positioning System) or GPS-derived location, speed, acceleration, or braking information; vehicle and/or vehicle equipment operation; external conditions (e.g., road, weather, traffic, and/or construction conditions); other vehicles or drivers in the vicinity of an accident; vehicle-to-vehicle (V2V) communications; vehicle-to-infrastructure communications; and/or image and/or audio information of the vehicle and/or insured driver before, during, and/or after an accident. The data may include other types of data, including those discussed elsewhere herein. The data may be collected via wired or wireless communication.

The data may be generated by mobile devices (smart phones, cell phones, lap tops, tablets, phablets, PDAs (Personal Digital Assistants), computers, smart watches, pagers, hand-held mobile or portable computing devices, smart glasses, smart electronic devices, wearable devices, smart contact lenses, and/or other computing devices); smart vehicles; dash or vehicle mounted systems or original telematics devices; public transportation systems; smart street signs or traffic lights; smart infrastructure, roads, or highway systems (including smart intersections, exit ramps, and/or toll booths); smart trains, buses, or planes (including those equipped with Wi-Fi or hotspot functionality); smart train or bus stations; internet sites; aerial, drone, or satellite images; third party systems or data; nodes, relays, and/or other devices capable of wireless RF (Radio Frequency) communications; and/or other devices or systems that capture image, audio, or other data and/or are configured for wired or wireless communication.

In some embodiments, the data collected may also derive from police or fire departments, hospitals, and/or emergency responder communications; police reports; municipality information; automated Freedom of Information Act requests; and/or other data collected from government agencies and officials. The data from different sources or feeds may be aggregated.

The data generated may be transmitted, via wired or wireless communication, to a remote server, such as a remote server and/or other processor(s) associated with an insurance provider. The remote server and/or associated processors may build a database of the telematics and/or other data, and/or otherwise store the data collected.

The remote server and/or associated processors may analyze the data collected and then perform certain actions and/or issue tailored communications based upon the data, including the insurance-related actions or communications discussed elsewhere herein. The automatic gathering and collecting of data from several sources by the insurance provider, such as via wired or wireless communication, may lead to expedited insurance-related activity, including the automatic identification of insured events, and/or the automatic or semi-automatic processing or adjusting of insurance claims.

In one embodiment, telematics data may be collected by a mobile device (e.g., smart phone) application. An application that collects telematics data may ask an insured for permission to collect and send data about driver behavior and/or vehicle usage to a remote server associated with an insurance provider. In return, the insurance provider may provide incentives to the insured, such as lower premiums or rates, or discounts. The application for the mobile device may be downloadable off of the internet.

III. Pre-Generated Requests for Assistance

Gathered telematics and/or other data (e.g., any type or types of telematics and/or other data described above in Section I and/or Section II) may facilitate determining the severity of (i) an accident; (ii) damage to a vehicle; and/or (iii) the injuries to the persons involved. The data gathered, such as data gathered after the accident, may facilitate determining what vehicle systems are broken or damaged, and/or are in need of minor or substantial repairs. The data gathered may indicate how much vehicle damage has occurred, and whether or not emergency services may be necessary and/or should be called or otherwise contacted.

The telematics and/or other data may also be used to (a) identify a first notice of loss, which in turn may be used to automatically start or initiate the claim handling process; and/or (b) accident reconstruction. Loss identification and/or accident reconstruction may then be paired individually and/or collectively with insurance policy data to automatically generate an insurance claim for an insured event. External data (e.g., public infrastructure or transportation system data) may also be used to determine the type and/or severity of the insured event, and the insurance claim may be modified accordingly.

A. Accident Identification

An insurance provider remote server (e.g., server 40 of FIG. 1) may promptly identify that an accident has occurred from the data gathered. Immediately after which, the remote server may automatically push a pre-generated or tailored message to the insured via wireless communication. The message may request that assistance be sent or directed to the current location of the insured or the vehicle accident. The insured may approve or modify the pre-generated message. The pre-generation of the message requesting assistance may substantially reduce an amount of time that it takes emergency responders to arrive at the scene of a serious accident in some instances. Such time savings may facilitate the saving of human lives with respect to certain vehicle accidents.

As an example, in the case of an accident, communications and/or options may be pushed to the insured's mobile device (e.g., mobile device 10 of FIG. 1). The insured or driver may be asked "Are you injured?"; "Do you need assistance or an ambulance?"; "Do you need the police sent?"; "Is the accident serious or minor?"; "How many people are injured?"; "Is anyone seriously injured?"; and/or "Is your vehicle still drivable?" via their mobile device (such as a smart phone, smart glasses, or wearable device) and/or vehicle wireless communication system.

In some embodiments, a customer or insured may control whether or not emergency responders (e.g., police, fire fighters, ambulances, tow trucks, or even insurance agents) are deployed to the scene of an accident. As suggested above, for example, a mobile device or smart phone application may ask the insured: "Have you been in an accident"; "Do you need assistance?"; "Is the accident serious?"; and/or other questions. The mobile device application may allow an insured to communicate with an insurance provider, and/or communicate directly to emergency responders, more effectively and efficiently than with conventional techniques, and/or may save time when it is of critical importance for those injured in a vehicle accident. Additionally or alternatively, the mobile device (and/or insurance provider remote server, such as remote server 40 of FIG. 1) may automatically call emergency services for the insured once (a) an accident has been detected from analysis of the telematics and/or other data collected, and/or (b) the severity of the accident has been automatically and remotely determined from the data.

B. Post-Accident Services

The mobile device application may (1) include and/or present a list of next steps that the insured should take after a vehicle accident (including instructions on how to submit an insurance claim, or automatically generate an insurance claim, for the insured event); (2) provide post-accident assistance; (3) allow for pre-selecting towing and/or auto repair service providers; and/or (4) call pre-determined persons (e.g., spouse, significant other, loved one, parents, children, friends, etc.). The mobile device application may allow the insured to customize the automatic or semi-automatic services that may be provided and/or presented to the insured when an insured event (e.g., vehicle accident) is detected from analysis of the telematics and/or other data.

The mobile device application (and/or application or functionality of a smart vehicle display or controller, such as smart vehicle controller 14 of FIG. 1) may automatically determine that a vehicle is likely no longer drivable from the data collected. After which, the mobile device application may present towing services (and ratings thereof) on a mobile device of the insured promptly and/or immediately after an accident. The insured may then pick a towing service using the mobile device (and/or smart vehicle) application. The application may then direct the mobile device and/or smart vehicle to electronically notify the towing service of a request for immediate service, such as via wireless communication.

The mobile device and/or smart vehicle application may also present options, such as whether to direct the mobile device and/or smart vehicle to call an insurance agent and/or family members. The options may allow the insured to control the communications, and/or the communications may be pre-set by the insured to automatically occur. For instance, if the telematics and/or other data gathered indicates that the insured is in a serious vehicle accident, the mobile device and/or smart vehicle application may direct the mobile device and/or smart vehicle to automatically notify the insured's spouse of the details of the accident, including severity, accident location, status of the insured or driver, and/or current location of the insured or driver (e.g., in an ambulance or at a hospital).

The mobile device and/or smart vehicle application may automatically generate an insurance claim, and/or attach associated data gathered from various sensors or systems pertinent to the insured event. The application may present the insured an option to automatically submit the automatically generated insurance claim, such as by pressing an icon or button on a user interface or display screen of a mobile device application or smart vehicle control system.

C. Application Customization

The mobile device and/or smart vehicle application may allow the insured to customize the application. The application may allow the insured to select services that are requested when an accident is detected from the data collected. The accident detection may trigger the pre-selected services being requested and/or include contacting police, an ambulance, and/or an insurance agent.

In one embodiment, the insurance provider may keep a user-customized profile of user preferences for an insured. The profile may indicate if a customer call center should proactively call the insured when collected data indicates that an accident has occurred. Also, for a serious accident, the insurance provider remote server may send a text or other message to the responsible insurance agent. The responsible insurance agent may then reach out to the insured promptly to provide individual customer service.

IV. Loss Mitigation Services

Gathered telematics and/or other data (e.g., any type or types of telematics and/or other data described above in Section I and/or Section II) may facilitate loss mitigation services. If an insured event happens, an insurance provider may be remotely notified via wireless communication and/or may identify such insured events based upon data remotely received from vehicles, mobile devices, and/or other electronic devices or systems.

The telematics and/or other data gathered may lead to triage of an auto accident. The data gathered may facilitate identification of whether the claim is minor and may be a "self-serve" type of claim. Additionally or alternatively, the data gathered may indicate that the claim is major, and may involve a fatality or a total loss claim. An application on a smart phone (e.g., mobile device 10 of FIG. 1, or on a smart vehicle controller such as smart vehicle controller 14 of FIG. 1) of the insured may automatically present options for the insured to submit a self-serve type of claim, and/or automatically or semi-automatically get the insured in contact with a representative of the insurance provider for more serious and complex claims. Moreover, any of the assistance requests discussed above in Section III may be automatically sent to the insured, to a first responder (e.g., hospital), and/or to other individuals or entities, for example (e.g., after approval or modification of the request by the insured).

The mobile device and/or smart vehicle application may allow two customers of the same insurance provider to exchange information after an accident. For instance, the applications and/or mobile devices may be equipped for Near Field Communication (NFC). The insurance customers may agree upon the facts of the accident, including who was at fault, and submit a single or joint insurance claim to the insurance provider via their mobile devices. Such submission, especially for minor accidents, may facilitate prompt and efficient handling of the insurance claim(s) by the insurance provider, and alleviate any inconvenience incurred on the part of the insured or group of insurance customers with respect to filing insurance claims and/or other paperwork.

V. Intelligent Routing and Other Recommendations

The present embodiments may facilitate generating intelligent routing and/or other recommendations, and transmitting those to an insured. Intelligent routing recommendations may be based upon vehicle location, route, and/or destination information. The intelligent routing may also be based upon historical data and/or real-time data. The historical and/or real-time data may relate to past or current accidents, weather, traffic, traffic patterns, road conditions, and/or road construction. The intelligent routing functionality, and/or usage (or percentage of usage) thereof, may be used to adjust insurance premiums or rates, and/or discounts.

A. Route Guidance

The intelligent routing recommendations may provide (e.g., via wireless communication, from server 40 of FIG. 1 to mobile device 10, and/or smart vehicle controller 14, of FIG. 1) directions and/or route guidance to a driver or insured based upon traffic patterns and/or actual accident data. The intelligent routing may also take into consideration current weather, construction, traffic, and/or other current conditions.

The intelligent routing recommendations may provide real-time warnings or updates to drivers or insurance customers. Moreover, the intelligent routing recommendations may lead to collision or accident avoidance; more efficient or quicker trips; driving through less traffic or construction; better gas mileage; and/or other benefits.

For instance, short-term or minor road construction projects that may occur with little or no notice may be promptly detected by an insured or the insured's smart vehicle. The GPS location of the minor road construction project (which may be temporarily shutting down a main traffic route or otherwise slowing down traffic) may be sent from the smart vehicle of the insured to the insurance provider remote server. The remote server may then estimate routes to divert traffic around the construction project and notify other insurance customers in the area of an alternate recommended route, such as via wireless communication to their smart vehicles (e.g., vehicle 8 or smart vehicle controller 14 of FIG. 1) or mobile devices (e.g. mobile device 10 of FIG. 1).

The telematics and/or other data may be used to generate messages or alerts transmitted to a smart vehicle or mobile device. A message may indicate that the driver is entering a danger zone associated with an above average risk. For instance, the area may have a lot of ongoing construction, and/or be associated with a higher than average number of accidents.

In one embodiment, the intelligent routing may utilize vehicle-to-vehicle (V2V) communication. The V2V communication may reveal that the vehicles ahead of an insured vehicle are all braking, indicating an accident ahead. The V2V communication data may be sent directly from one vehicle to an insured vehicle (e.g., from vehicle 6 to vehicle 8 of FIG. 1), or alternatively, from one vehicle to a remote telematics or an insurance provider server (e.g., from vehicle 6 to server 40 of FIG. 1). The remote server may then send a message or warning to the insured or insured vehicle to slow down, or even exit a highway and take an alternate route. Access to the remote server may be granted via a subscription service or as a customer service provided by the insurance provider.

V2V communication may include sending a message to a smart vehicle or mobile device directing the smart vehicle or mobile device to automatically start recording telematics data. For instance, V2V communication may indicate that an accident has occurred or is likely to happen. In such situations, automatically recording telematics and/or other data may facilitate accident reconstruction and/or cause of accident determination.

B. Accident Location Reporting

In one embodiment, an insured may opt-in to a program that allows or facilitates, from telematics and/or other data, automatic vehicle accident location reporting. Reporting accident locations in real-time to an insurance provider remote server may facilitate the remote server determining intelligent routes for a group of other insurance customers presently on the road. Customers currently traveling toward the scene of the accident may be re-directed by the remote server. The intelligent routes may direct each of the other insurance customers away from, or to avoid, the scene of the accident, facilitating more efficient and safer travel.

In other words, if one insured self-reports an accident location (e.g., via automatic wireless communication indicating GPS location information), other insurance customers or drivers may be able to promptly and effectively avoid the accident scene through intelligent routing. The intelligent routing may not only consider avoidance of the accident scene, but also other driving risk conditions, such as current traffic, construction, and/or weather conditions, to determine an overall lowest risk alternate route to each vehicle's respective destination.

C. Other Recommendations

Telematics and/or other data gathered (e.g., any type or types of telematics and/or other data described above in Section I and/or Section II) may reveal certain trends about an insured. The data may indicate that the insured is typically driving in areas associated with an above-average number of accidents and/or high crime neighborhoods. The data may also indicate that the insured is driving over the speed limit too much and/or taking turns while driving above a recommended speed. The high risk accident areas or corners may be highlighted on a road map display, such as a vehicle navigation unit, for ease of viewing.

In response, the insurance provider remote server may push appropriate recommendations to the insured, such as recommendations to take certain corners at a slower speed and/or avoid traveling on roads, or through areas, associated with a high number of past accidents. The insurance provider remote server may also present an insurance-related benefit on a display that may be earned if the insured follows the insurance-related recommendations as a means of incentivizing lower risk driving behavior.

VI. Theft Prevention & Mitigation

A telematics device may determine that the driver of a vehicle is not the owner or an authorized driver (e.g., not someone covered under the auto insurance policy). The vehicle and/or mobile device may determine that an unknown driver is attempting or may attempt to start an insured vehicle, or is already driving the insured vehicle, by detecting that an unknown or unrecognized mobile device (e.g., smart phone) is in the vehicle.

As an example, allowed/authorized mobile device Bluetooth signatures may be detected from normal mobile device operation. However, if an unrecognized Bluetooth signal is detected, it may be determined that the vehicle has been stolen, especially if GPS information from the insured's mobile device indicates that the insured is not presently in the insured vehicle. The insured, insurance provider, and/or police may all be automatically notified of the theft.

Additionally or alternatively, a current GPS location of the insured vehicle may be displayed on a virtual map of a mobile device application, along with speed and direction information. The mobile device application with "Find My Car" functionality may be used to locate vehicles parked in large parking lots, such as a shopping mall or airport, where the insured may have forgotten where they have parked, and/or may be used to locate stolen vehicles.

The telematics and/or other data may indicate that a home is left unoccupied for a substantial length of time. For instance, it may be determined from the data collected indicates how often an insured visits and/or how much the insured spends at a second or vacation home. If an insured home is left unoccupied for a substantial amount of time, a recommendation may be sent to the insured to monitor the condition or status of the home more closely to alleviate the risk of theft and/or needed repairs being left unattended to. Insurance savings (e.g., a premium discount) may be provided to the insured in return for following the recommendations provided by the insurance provider.

VII. Exemplary Loss Mitigation Method

Figure 3:
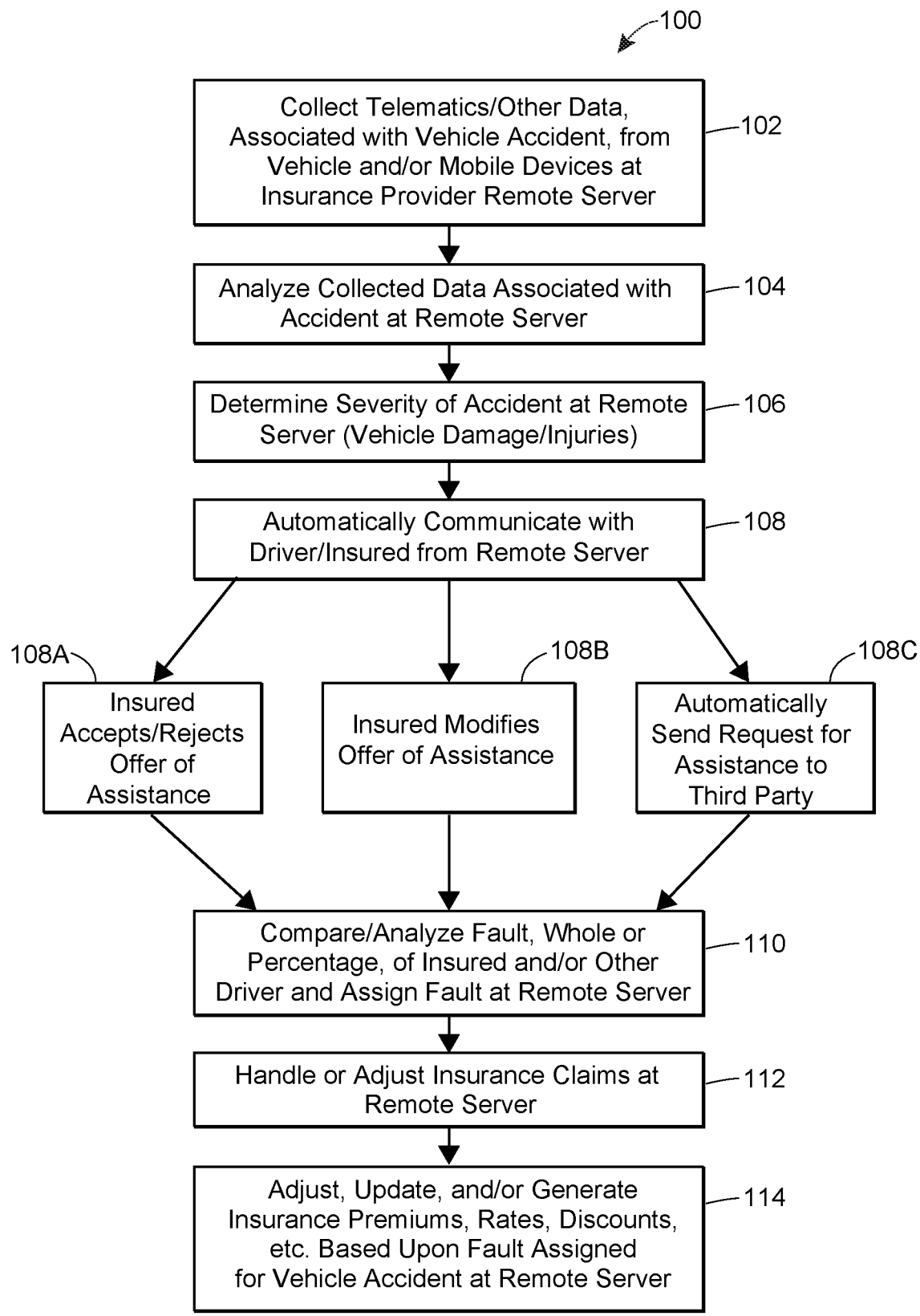
FIG. 3 illustrates an exemplary computer-implemented method of loss mitigation associated with an insured event, according to one embodiment.

FIG. 3 illustrates an exemplary computer-implemented method 100 of loss mitigation associated with a vehicle accident. In some embodiments, the method 100 may be implemented in whole or in part by one or more components of the system 1 depicted in FIG. 1. For example, the method 100 may be implemented by one or more servers remote from the components (e.g., sensors, vehicles, mobile devices, etc.) sourcing telematics data, such as the server 40 (e.g., processor(s) 62 of the server 40 when executing instructions stored in the program memory 60 of the server 40) or another server not shown in FIG. 1.

The method 100 may include collecting accident data associated with a vehicle accident involving a driver (block 102). The driver may be associated with an insurance policy issued by the insurance provider (e.g., an owner of the policy, or another individual listed on the policy). The accident data may include telematics data, and possibly other data, collected from one or more sources. For example, the accident data may include data associated with or generated by one or more mobile devices (e.g., mobile device 10 of FIGS. 1 and 2); an insured vehicle or a computer system of the insured vehicle (e.g., vehicle 8 or smart vehicle controller 14 of FIGS. 1 and 2, or one or more sensors mounted on the vehicle); a vehicle other than the insured vehicle (e.g., vehicle 6 of FIG. 1); vehicle-to-vehicle (V2V) communication (e.g., communications between vehicle 8 and vehicle 6 in FIG. 1); and/or roadside equipment or infrastructure located near a location of the vehicle accident (e.g., infrastructure components 26 of FIG. 1). Generally, the accident data may include any one or more of the types of data discussed above in Section I and/or II (and/or other suitable types of data), and may be collected according to any of the techniques discussed above in Section I and/or II (and/or other suitable techniques). The accident data may have been generated by the respective source(s), and/or collected, before, during and/or after the accident.

The method 100 may also include analyzing any or all of the collected accident data (block 104), and determining a likely severity of the accident based upon the analysis (block 106). For example, it may be determined that an accident is likely severe (e.g., likely involves severe personal injury) if accelerometer data included in the accident data indicates a very large and abrupt change in speed. As another example, it may be determined that an accident is likely severe if the accident data (e.g., from a vehicle-mounted camera) shows that the accident was a head-on accident between two vehicles.

The method 100 may also include automatically communicating with the driver (e.g., the insured) (block 108). For example, a communication related to emergency assistance or an emergency assistance recommendation may be generated based upon the likely severity as determined at block 106, and then transmitted from one or more remote servers implementing the method 100 to a mobile device associated with (e.g., owned and/or carried by) the driver, such as mobile device 10 of FIG. 1. The communication may take any of various different forms, such as, for example, "Are you injured?"; "Do you need assistance or an ambulance?";

"Do you need the police sent?"; "Is the accident serious or minor?"; "How many people are injured?"; "Is anyone seriously injured?"; and/or "Is your vehicle still drivable?"

Alternative embodiments and/or scenarios corresponding to block 108 (and/or a process subsequent to block 108) are reflected in blocks 108A through 108C. For example, the driver (e.g., insured) may either accept or reject the emergency assistance indicated in the communication (block 108A), e.g., by making a selection via a user interface of the mobile device, in response to a prompt that appears in connection with the communication. Alternatively, the driver may modify the emergency assistance request or recommendation (block 108B), e.g., by indicating a different type of emergency assistance (ambulance, police, etc.). Again, the modification may be made via a user interface of the mobile device, in response to a prompt that appears in connection with the communication. As yet another alternative, an emergency assistance request may automatically be sent to a third party (e.g., police department, fire department, hospital, etc.) without waiting for any feedback from the driver (block 108C). For example, the communication at block 108 may merely notify the driver that emergency assistance has been requested, and possibly specify the type of assistance requested.

Although not shown in FIG. 3, the method 100 may also include receiving a wireless communication from the driver (e.g., from the mobile device of the driver) in response to the communication at block 108. The wireless communication may indicate whether the driver approved and/or modified (or rejected) the recommended or proposed emergency assistance, for example. In such an embodiment, if the assistance is not rejected, the method 100 may further include notifying a third party (e.g., police department, fire department, hospital, etc.) of the proposed emergency assistance, in accordance with the modifications, if any, made by the driver.

The method 100 may also include determining (e.g., based upon the analysis at block 104) fault of the driver for the accident. As seen in FIG. 3, for example, the fault for the driver (e.g., the insured) and/or for another driver may be compared or otherwise analyzed, and assigned to the appropriate party or parties (block 110). The fault may be determined as one or more binary indicators (e.g., "at fault" or "not at fault"), percentages (e.g., "25% responsible"), ratios or fractions, and/or any other suitable indicator(s) or measure(s) of fault. In some embodiments and/or scenarios, fault for a first individual is implicitly determined based upon the fault that is explicitly determined for another individual (e.g., an insured may implicitly be determined to have 0% fault if another driver is explicitly determined to be 100% at fault).

The method 100 may also include handling an insurance claim associated with the accident (block 112). For example, the fault of the driver (e.g., insured) determined at block 110 may be used to determine the appropriate payout by the insurance provider, or whether another insurance provider should be responsible for payment, etc.

The method 100 may also include adjusting, generating and/or updating one or more insurance-related items (block 114). The insurance-related item(s) may include, for example, parameters of the insurance policy (e.g., a deductible), a premium, a rate, a discount, and/or a reward. The adjustment, generation and/or update may be based upon the fault determined at block 110, or based upon the driver having the emergency assistance functionality that allows the method 100 to be performed (e.g., a mobile device application that enables the driver to receive the communication sent at block 108 and/or to send the wireless communication received at block 108), for example.

In other embodiments, the method 100 may include additional, fewer, or alternate actions as compared to those shown in FIG. 3, including any of those discussed elsewhere herein. For example, the method 100 may further include transmitting information indicative of the adjusted, generated, or updated insurance-related items to a mobile device associated with the driver (or another individual associated with the insurance policy), such as mobile device 10 of FIG. 1, to be displayed on the mobile device for review, modification, or approval by the driver or other individual.

As another example, the method 100 may further include receiving a wireless communication from the driver cancelling emergency assistance that has already been requested from a third party. As yet another example, the method 100 may include (1) generating an estimated insurance claim based upon the likely severity determined at block 106; (2) transmitting the estimated insurance claim to the driver's or insured's mobile device to facilitate presenting all or some of the claim to the driver or insured; (3) receiving a wireless communication from the driver or insured indicating approval, rejection or modification of the claim; and/or (4) handling the claim in accordance with the approval, rejection or modification. In still other example embodiments, the method 100 may omit blocks 110, 112 and/or 114.

As can be seen from the above discussion, the method 100 may enable a prompt response by the appropriate personnel (e.g., by first responders with an ambulance), and various components (e.g., in the example system 1) may complete their associated tasks relatively quickly and/or efficiently. For instance, the processor 62 of FIG. 1 may require much less time and/or far fewer processing cycles to request emergency assistance than if an insurance provider employee were to learn about the accident via other means (e.g., a phone call from the insured or passenger) and then instruct processor 62 to generate a request for help.

VIII. Additional Exemplary Loss Mitigation Methods

In one aspect, a computer-implemented method of loss mitigation may be provided. The method may include (1) collecting or receiving telematics and/or other data at or via a remote server associated with an insurance provider, the telematics and/or other data being associated with a vehicle accident involving a specific driver and/or an insured. The insured may own an insurance policy issued by the insurance provider, and the telematics and/or other data may be gathered before, during, and/or after the vehicle accident. The method may include (2) analyzing the telematics and/or other data at and/or via the remote server; (3) determining, at and/or via the remote server, a likely severity of the vehicle accident from the analysis of the telematics and/or other data; (4) generating a communication related to emergency assistance or an emergency assistance recommendation, at the remote server, based upon the likely severity of the vehicle accident that is determined from the analysis of the telematics and/or other data; (5) transmitting, via wireless communication, the communication related to the emergency assistance or emergency assistance recommendation from the remote server to a mobile device or smart vehicle associated with the specific driver and/or insured; (6) receiving, at and/or via the remote server, a wireless communication from the specific driver and/or insured indicating approval, rejection, or modification of the emergency assistance or emergency assistance recommendation; and/or (7) notifying, via communication sent from the remote server, the emergency assistance approved and/or requested by the specific driver to a third party, such as emergency responders (i.e., police or medical personnel). The method may include additional, fewer, or alternate actions, including those discussed elsewhere herein.

For instance, the method may include adjusting, generating, and/or updating, at and/or via the remote server, an insurance policy, premium, rate, discount, and/or reward for the specific driver and/or the insured based upon having the emergency assistance functionality. The method may further comprise transmitting information related to the adjusted, generated, and/or updated insurance policy, premium, rate, discount, and/or reward from the remote server to a mobile device associated with the specific driver and/or insured to facilitate presenting, on a display of the mobile device, all or a portion of the adjusted, generated, and/or updated insurance policy, premium, rate, discount, and/or reward to the specific driver and/or insured for their review, modification, and/or approval. Also, the telematics and/or other data may include the types of data discussed elsewhere herein.

In another aspect, another computer-implemented method of loss mitigation may be provided. The method may include (1) collecting or receiving telematics and/or other data at or via a remote server associated with an insurance provider, the telematics and/or other data being associated with a vehicle accident involving a specific driver and/or an insured. The insured may own an insurance policy issued by the insurance provider, and the telematics and/or other data may be gathered before, during, and/or after the vehicle accident. The method may include (2) analyzing the telematics and/or other data at and/or via the remote server; (3) determining, at and/or via the remote server, a likely severity of the vehicle accident from the analysis of the telematics and/or other data; (4) generating a communication related to emergency assistance or an emergency assistance recommendation, at and/or via the remote server, based upon the likely severity of the vehicle accident that is determined from the analysis of the telematics and/or other data; and/or (5) transmitting, via wireless communication, the communication related to the emergency assistance or emergency assistance recommendation from the remote server directly to a third party, such as a police department, fire department, and/or hospital to facilitate prompt and appropriate emergency responder response to the vehicle accident.

The method may further comprise notifying the specific driver and/or insured, via wireless communication sent from the remote server, that the emergency assistance from the third party has been requested, and/or receiving from the specific driver and/or insured, at or via the remote server, a wireless communication indicating a cancellation of the emergency assistance from the third party and/or that the emergency assistance is not necessary. The method may include adjusting, generating, and/or updating, via the remote server, an insurance policy, premium, rate, discount, and/or reward for the specific driver and/or the insured based upon having the emergency assistance functionality.

The method may include transmitting information related to the adjusted, generated, and/or updated insurance policy, premium, rate, discount, and/or reward from the remote server to a mobile device associated with the specific driver and/or insured to facilitate presenting, on a display of the mobile device, all or a portion of the adjusted, generated, and/or updated insurance policy, premium, rate, discount, and/or reward to the specific driver and/or insured for their review, modification, and/or approval.

IX. Exemplary Estimated Claim Generation Method

In one aspect, a computer-implemented method of generating an insurance claim for an insured may be provided. The method may include: (1) collecting or receiving telematics and/or other data (e.g., any of the telematics and/or other data described above in Section I and/or Section II) at or via a remote server associated with an insurance provider (e.g., server 40 of FIG. 1), the telematics and/or other data being associated with a vehicle accident involving a specific driver and/or an insured, the insured owning an insurance policy issued by the insurance provider and the telematics and/or other data being gathered before, during, and/or after the vehicle accident; (2) analyzing the telematics and/or other data at or via the remote server; (3) determining, at or via the remote server, a likely severity of the vehicle accident from the analysis of the telematics and/or other data; (4) generating an estimated insurance claim, at or via the remote server, based upon the severity of the vehicle accident determined from the analysis of the telematics and/or other data; (5) transmitting, via wireless communication, the estimated insurance claim from the remote server to a mobile device associated with the specific driver and/or insured (e.g., mobile device 10 of FIG. 1) to facilitate presenting all, or a portion of, the estimated insurance claim to the specific driver and/or insured; (6) receiving, at or via the remote server, a wireless communication from the specific driver and/or insured indicating approval, rejection, or modification of the estimated insurance claim; and/or (7) handling or addressing the estimated insurance claim, at or via the remote server, in accordance with the specific driver and/or insured's approval, rejection, or modification of the estimated insurance claim. The method may further include (8) adjusting, generating, and/or updating, at or via the remote server, an insurance policy, premium, rate, discount, and/or reward for the specific driver and/or the insured (or insured vehicle) based upon the estimated insurance claim. The method may include additional, fewer, or alternate actions, including those discussed elsewhere herein.

X. Exemplary Intelligent Routing Method

Figure 4:
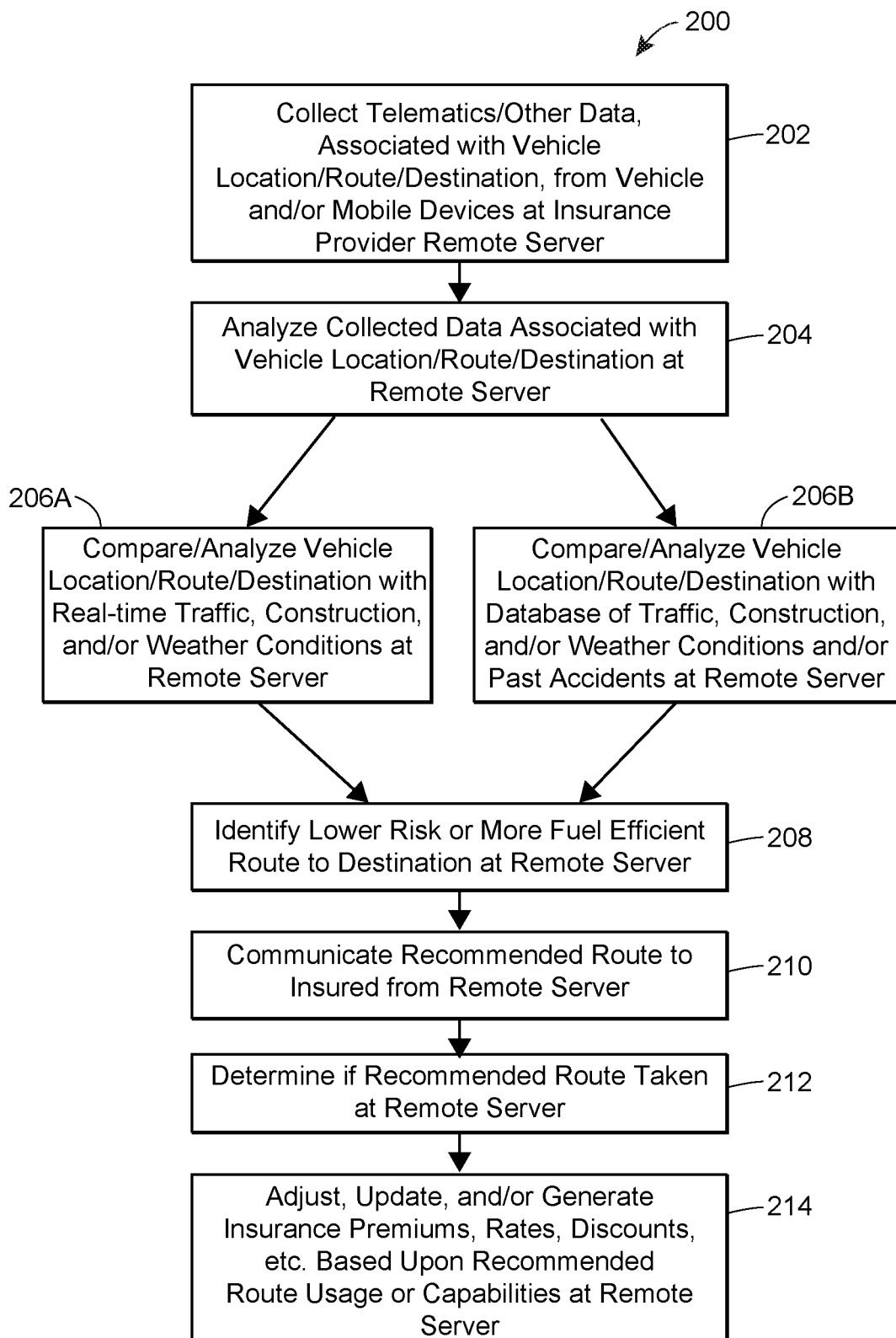
FIG. 4 illustrates an exemplary computer-implemented method of providing intelligent routing to reduce risk and/or the likelihood of an insured event occurring, according to one embodiment.

FIG. 4 illustrates an exemplary computer-implemented method 200 of providing intelligent routing to reduce risk and/or the likelihood of an insured event from occurring. In some embodiments, the method 200 may be implemented in whole or in part by one or more components of the system 1 depicted in FIG. 1. For example, the method 200 may be implemented by one or more servers remote from the components (e.g., sensors, vehicles, mobile devices, etc.) sourcing telematics data, such as the server 40 (e.g., processor(s) 62 of the server 40 when executing instructions stored in the program memory 60 of the server 40) or another server not shown in FIG. 1.

The method 200 may include receiving trip information including a vehicle's destination, planned route, and/or current location. As seen in FIG. 4, for example, the method 200 may include collecting telematics and/or other data associated with the vehicle's location, route, and/or destination (and possibly other information, such as the vehicle's origination point) at an insurance provider remote server (block 202). The data may include GPS, navigation, and/or other data associated with, or generated by, the driver's mobile device, the driver's vehicle (or a computer system thereof), another vehicle (e.g., a vehicle in the vicinity of the driver's vehicle), V2V communication, and/or roadside equipment and/or infrastructure, for example.

The method 200 may also include analyzing the data/information collected at block 202 (block 204). In some embodiments and/or scenarios, the method 200 may include comparing/analyzing the vehicle location, route, and/or destination with real-time traffic, construction, and/or weather conditions (block 206A). The real-time traffic, construction, and/or weather conditions may be telematics data collected from other vehicles (and/or roadside equipment or infrastructure, etc.), for example. In other embodiments and/or scenarios, the method 200 may include comparing/analyzing the vehicle location, route, and/or destination with information in a database of traffic conditions, construction conditions, weather conditions, and/or past accidents (block 206B). The method 200 may include building the database using traffic, construction, weather, and/or accident information gathered from one or more sources (e.g., news feeds, telematics data, etc.), for example.

The method 200 may also include identifying a lower risk route or routes between the vehicle's current location and the destination (block 208). For example, the method 200 may include identifying areas (e.g., roads or road segments) associated with higher risk of vehicle accident using collected vehicle telematics data and/or database (e.g., traffic, construction, weather, accident, etc.) information, and the route(s) may be identified/determined at block 208 such that those high-risk areas are avoided. Alternatively, as seen in FIG. 4, the method 200 may include identifying a more fuel-efficient route from the vehicle's current location to the destination at block 208.

The method 200 may also include communicating at least one of the one or more identified lower risk routes to the driver (e.g., the insured) as a recommended route to the destination (block 210). The route may be communicated via wireless communication to a mobile device and/or a smart vehicle of the driver (e.g., to mobile device 10, and/or a vehicle navigation system of vehicle 8, of FIG. 1), for example.

The method 200 may also include determining whether the recommended route was taken by the driver based upon analysis of telematics and/or other data (block 212). For example, GPS data may be received from the driver's mobile device or smart vehicle, and used to determine whether the recommended route was followed or a different route was taken instead.

The method 200 may also include adjusting, updating, and/or generating one or more insurance-related items based upon the determination at block 212 (block 214). The insurance-related item(s) may include, for example, parameters of the insurance policy (e.g., a deductible), a premium, a rate, a discount, and/or a reward. Alternatively, or additionally, the insurance-related item(s) may be adjusted, updated, and/or generated (e.g., insurance discounts may be provided) based upon an amount of usage, by the driver or another individual associated with the same insurance policy, of the intelligent routing functionality (e.g., a number or percentage of recommended routes taken, etc.).

In other embodiments, the method 200 may include additional, fewer, or alternate actions as compared to those shown in FIG. 4, including any of those discussed elsewhere herein. For example, the method 200 may omit block 212 and/or block 214.

As can be seen from the above discussion, the method 200 may efficiently determine low-risk routes for drivers. For instance, the processor 62 of FIG. 1 may centrally determine low-risk routes for numerous different drivers in much less time than would be needed if those drivers were to instead use personal (e.g., mobile) computing devices to directly collect, and manually review, information (e.g., past or current accident information) needed to identify their own low-risk routes.

XI. Additional Exemplary Intelligent Routing Methods

In another aspect, a computer-implemented method of intelligent routing may be provided. The method may include (1) collecting telematics and/or other data and/or building a database related to multiple vehicle accidents; (2) identifying, via a processor or remote sever, areas of higher than average vehicle accidents and/or less risky travel routes or roads; (3) receiving, at or via the remote server, a destination, a planned route, and/or a current location of a vehicle, such as from telematics related data; (4) based upon the destination, planned route, or current location of the vehicle, determining, at or via the remote server, a recommended route to the destination that avoids the areas of higher than average vehicle accidents and/or reduces accident associated risk; and/or (5) transmitting the recommended route from the remote server to the insured and/or driver via wireless communication for display on the vehicle navigation system and/or a mobile device associated with the insured and/or driver to facilitate the insured and/or driver traveling via a route associated with lower risk of accident.

The method may include generating insurance discounts based upon an amount that the insured uses the intelligent routing functionality provided by an insurance provider. The telematics and/or other data may include the data indicated elsewhere herein. The method of intelligent routing may include additional, fewer, or alternative actions, including those discussed elsewhere herein.

In another aspect, another method of intelligent routing may be provided. The method may include: (1) building a database associated with road traffic, construction areas, and/or vehicle accidents; (2) receiving, at or via an insurance provider remote server, a vehicle destination and a current vehicle location associated with an insured vehicle from the insured vehicle and/or a mobile device of a driver and/or insured associated with the insured vehicle, such as from telematics related data; (3) analyzing, at or via the insurance provider remote server, the vehicle destination and the current vehicle location associated with the insured vehicle in conjunction with the database associated with the road traffic, construction areas, and/or vehicle accidents to determine a low risk recommended or alternate route to the destination; and/or (4) transmitting from the remote server, the low risk recommended or alternate route to the destination to the vehicle and/or a mobile device associated with the driver and/or insured to facilitate the driver and/or insured taking the low risk recommended or alternate route to the destination.

The method may include generating insurance discounts based upon an amount of usage (by an insured) of the intelligent routing functionality provided by an insurance provider. The telematics and/or other data may include the data indicated elsewhere herein. The method of intelligent routing may include additional, fewer, or alternative actions, including those discussed elsewhere herein.

XII. Exemplary Theft Prevention or Mitigation Method

Figure 5:
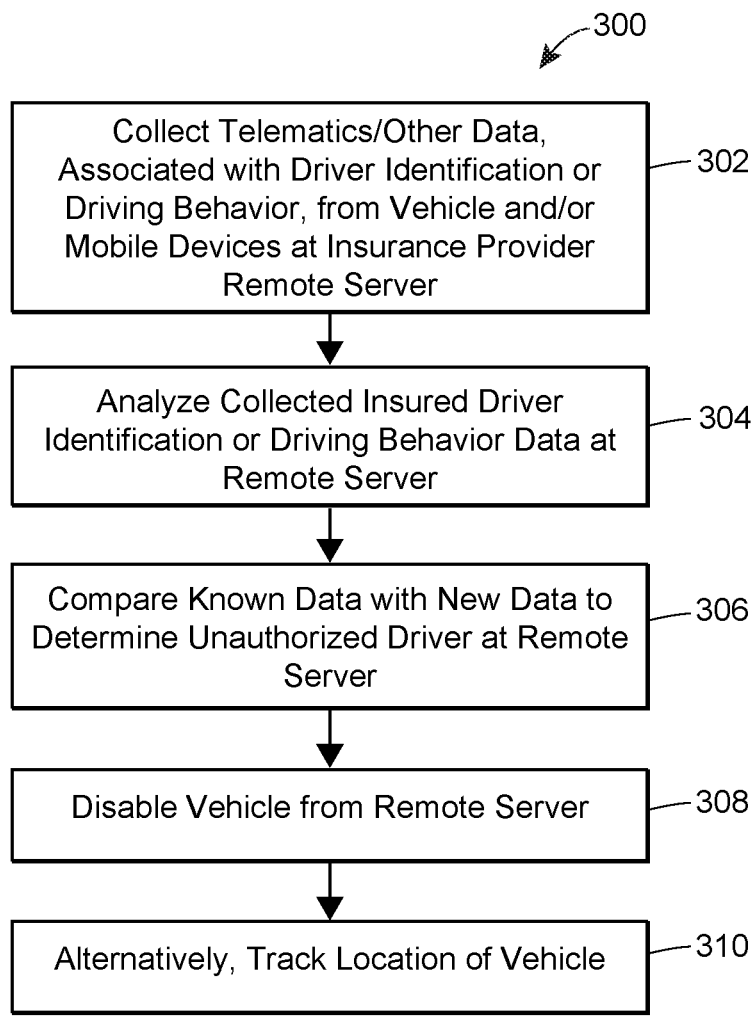
FIG. 5 illustrates an exemplary computer-implemented method of theft prevention and/or mitigation, according to one embodiment.

FIG. 5 illustrates an exemplary computer-implemented method 300 of theft prevention or mitigation. In some embodiments, the method 300 may be implemented in whole or in part by one or more components of the system 1 depicted in FIG. 1. For example, the method 300 may be implemented by one or more servers remote from the components (e.g., sensors, vehicles, mobile devices, etc.) sourcing telematics data, such as the server 40 (e.g., processor(s) 62 of the server 40 when executing instructions stored in the program memory 60 of the server 40) or another server not shown in FIG. 1. While the blocks of FIG. 5 refer to a "remote server," however, it is understood that other components may implement the method 300 in other embodiments. For example, the method 300 may be implemented by a vehicle controller, such as the smart vehicle controller 14 of FIGS. 1 and 2, or another vehicle controller not shown in FIG. 1 or 2.

The method 300 may include collecting driver-related data over time (block 302). The data may be associated with one or more authorized drivers of an insured vehicle (e.g., a policy owner and one or more family members), with the driver(s) and vehicle being covered by an insurance policy issued by an insurance provider (e.g., an insurance provider associated with one or more servers implementing the method 300, in one embodiment). In particular, the collected driver-related data may be associated with identification and/or driving behavior of the driver(s). For example, the driver-related data may include data indicative of driver weights, driver appearances, acceleration, braking and/or cornering behaviors of the drivers, and so on.

The driver-related data may include telematics data, and possibly other data, collected from one or more sources. For example, the driver-related data may include data associated with or generated by one or more mobile devices (e.g., mobile device 10 of FIGS. 1 and 2); an insured vehicle or a computer system of the insured vehicle (e.g., vehicle 8 or smart vehicle controller 14 of FIGS. 1 and 2, or one or more sensors mounted on the vehicle, such as a driver's seat weight sensor, or a vehicle-mounted camera for capturing images of drivers, etc.); a vehicle other than the insured vehicle (e.g., vehicle 6 of FIG. 1); vehicle-to-vehicle (V2V) communication (e.g., communications between vehicle 8 and vehicle 6 in FIG. 1); and/or roadside equipment or infrastructure located near a location of the vehicle accident (e.g., infrastructure components 26 of FIG. 1). Generally, the driver-related data may include any one or more of the types of data discussed above in Section I and/or II (and/or other suitable types of data), and may be collected according to any of the techniques discussed above in Section I and/or II (and/or other suitable techniques).

The collected driver-related data may be analyzed (block 304). For example, the data may be analyzed in order to determine an "electronic signature" for the mobile device of each authorized driver. As another example, vehicle operation data such as acceleration, braking and cornering, and/or other data, may be analyzed to determine higher-level behaviors of a driver (e.g., how often the driver brakes suddenly, or how often and/or by how much the driver exceeds the speed limit, etc.). Data may also be analyzed to categorize the data according to driver (e.g., determine, based upon weights or other identifying data, which driving behaviors correspond to which authorized driver, etc.).

While not shown in FIG. 5, the method 300 may also include a block in which a database associated with the authorized driver(s) is built based upon the driver-related data. For example, the output data produced by the analysis at block 304 (e.g., driver-specific weights, images or facial features, driving behaviors, etc.) may be stored in the database.

The known data (e.g., stored in the database) may be compared to new data to determine that a driver is unauthorized, i.e., not one of the individuals covered by the insurance policy (block 306). While referred to here as an unauthorized "driver," the individual may be currently driving the insured vehicle, or may merely be attempting to start the vehicle or even just sitting in a seat (e.g., driver's seat) of the vehicle.

While not shown in FIG. 5, the method 300 may include a block in which current or real-time driver-related data is collected prior to making the comparison at block 306. For example, current telematics and/or other data associated with the unauthorized individual may be collected (e.g., in a manner similar to that described above in connection with block 302) in order to determine identifying characteristics and/or driving behaviors of the individual.

The comparison at block 306 may include, for example, comparing a weight of the current driver with the weights of each authorized driver (e.g., based upon data that was generated by a driver's seat weight sensor of the insured vehicle), comparing an appearance of the current driver with the appearance of each authorized driver (e.g., based upon image data captured by a vehicle-mounted camera and using suitable image processing techniques), and/or comparing electronic signatures or signals of mobile devices of the authorized drivers with an unknown electronic signature or signal of an unrecognizable mobile device associated with the unauthorized individual. Additionally or alternatively, the comparison may include comparing acceleration, braking and/or cornering behaviors or patterns of the current driver with like behaviors or patterns of each authorized driver, etc.

After determining that the current driver is unauthorized, the insured vehicle may be disabled (block 308). For example, a remote server implementing the method 300 may send a wireless signal to a vehicle controller within the insured vehicle (e.g., smart vehicle controller 14 of FIG. 1), causing the insured vehicle to gradually and slowly come to a halt (if currently moving), or preventing the insured vehicle from being started (if not yet moving), etc. In some embodiments, the disablement/prevention may only occur if an authorized driver (e.g., the policy owner) acknowledges/confirms that the person currently driving (or attempting to start, etc.) the insured vehicle does not have the permission of the policy owner and/or vehicle owner to drive the insured vehicle.

Disablement of the vehicle may also depend upon other conditions being satisfied. For example, it may first need to be verified that the unauthorized individual is sitting in a driver's seat of the insured vehicle (e.g., rather than simply being a passenger). The verification may be made by triangulation or communication techniques between the unauthorized individual's mobile device and a vehicle-mounted transmitter, and/or using a visual image of the unauthorized individual, for example.

As an alternative to block 308, the method 300 may include tracking the location of the insured vehicle (block 310). Vehicle tracking may be accomplished using GPS coordinates, for example, and may persist until the vehicle is returned to the vehicle owner. The method 300 may also include transmitting a current GPS location of the insured vehicle to a mobile device of one of the authorized drivers (e.g., the policy owner and/or vehicle owner), and/or to a third party remote server (e.g., a server associated with a police department).

In other embodiments, the method 300 may include additional, fewer, or alternate actions as compared to those shown in FIG. 5, including any of those discussed elsewhere herein. For example, instead of (or in addition to) block 308, the method 300 may include notifying one of the authorized drivers (e.g., the policy owner) and/or authorities (e.g., a server of a police department), via wired or wireless communications, that the insured vehicle was (or may be) stolen.

As can be seen from the above discussion, the method 300 may efficiently prevent vehicle theft, or efficiently mitigate the losses and/or inconveniences due to such a theft. For instance, the processor 62 of FIG. 1 may detect a likely vehicle theft far more quickly than if an insurance provider employee were to input theft reporting data to server 40 only after an insured or other individual recognized, and then called to report, the theft.

XIII. Additional Exemplary Theft Prevention or Mitigation Method

In one aspect, a computer-implemented method of vehicle theft prevention or mitigation may be provided. The method may include: (1) collecting or receiving telematics and/or other data at or via a remote server associated with an insurance provider (or at or via a vehicle controller) over time, the telematics and/or other data being associated with an insured driver or family member driving an insured vehicle (and/or their identification), the insured vehicle being covered by an insurance policy issued by the insurance provider; (2) building, at or via the remote server (or vehicle controller), a database of insured drivers or family members (i) authorized to drive the insured vehicle, and/or (ii) covered by the insurance policy; (3) collecting or receiving current telematics and/or other data at or via the remote server (or vehicle controller) associated with an individual attempting to start or currently driving the insured vehicle; (4) determining, at or via the remote server (or vehicle controller), that the individual attempting to start or currently driving the insured vehicle is not among the insured drivers or family members (i) authorized to drive the insured vehicle, or (ii) covered by the insurance policy; and/or (5) if so, then directing or controlling, at or via the remote server (or vehicle controller), a disablement of an operation of the insured vehicle (i.e., preventing the vehicle from operating, or safely or orderly slowing the down the vehicle to a halt and/or moving the vehicle off to the side of the road) and/or preventing the individual from starting or otherwise operating the insured vehicle to facilitate preventing or mitigating theft of the insured vehicle.

The determining, at or via the remote server (or vehicle controller), that the individual attempting to start, or currently driving, the insured vehicle is not among the insured drivers or family members (i) authorized to drive the insured vehicle, or (ii) covered by the insurance policy may be performed by comparing electronic signatures or signals of mobile devices of the insured drivers or family members with an unknown electronic signature or signal of a unrecognizable mobile device associated with the individual attempting to start, or currently driving, the insured vehicle, or otherwise sitting in a driver's seat of the insured vehicle. The method may include verifying, before preventing operation of the insured vehicle, that the unknown individual attempting to start, or currently driving, the insured vehicle is sitting in the driver's seat of the insured vehicle, such as via (a) triangulation or communication techniques between the unrecognizable mobile device and vehicle mounted transmitters, and/or (b) using visual images gathered or collected from the telematics and/or other data.

In one embodiment, determining, at or via the remote server (or vehicle controller), that the individual attempting to start, or currently driving, the insured vehicle is not among the insured drivers or family members (i) authorized to drive the insured vehicle, or (ii) covered by the insurance policy is performed by comparing electronic signatures or signals of various mobile devices. In another embodiment, determining, at or via the remote server (or vehicle controller), that the individual attempting to start, or currently driving, the insured vehicle is not among the insured drivers or family members (i) authorized to drive the insured vehicle, or (ii) covered by the insurance policy is performed by comparing (a) visual images (such as gathered by vehicle mounted cameras or mobile devices) or weights (such as determined from seat sensors) of the insured drivers or family members with (b) visual images or a weight of the individual attempting to start, or currently driving, the insured vehicle, respectively.

In one aspect, the telematics and/or other data may include data associated with, or generated by, mobile devices, such as smart phones, smart glasses, and/or smart wearable electronic devices capable of wireless communication. The telematics and/or other data may include data associated with, or generated by, an insured vehicle or a computer system of the insured vehicle. The telematics and/or other data may include data associated with, or generated by, (i) a vehicle other than the insured vehicle; (ii) vehicle-to-vehicle (V2V) communication; and/or (iii) road side equipment or infrastructure.

The method may further include, when it is determined, at or via the remote server (or vehicle controller), that the individual attempting to start, or currently driving, the insured vehicle is not among the insured drivers or family members (i) authorized to drive the insured vehicle, or (ii) covered by the insurance policy, generating a message (or wireless communication) and transmitting the message from the remote server (or vehicle controller) to a mobile device of one of the insured drivers or family members, or to authorities to facilitate vehicle recapture or safety. The method may include tracking the GPS location of the insured vehicle at the remote server (or vehicle controller), and/or transmitting the present GPS location of the insured vehicle to a mobile device of an insured or to a third party remote server, such as a police department. The method may include additional, fewer, or alternate actions, including those discussed elsewhere herein.

XIV. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and systems disclosed herein without departing from the spirit and scope defined in the appended claims. Finally, the patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A computer-implemented method of vehicle accident response, the method comprising:
   collecting, at one or more servers via a communication network, telematics data associated with the vehicle at a time of a vehicle accident:
   determining, by the one or more servers, one or more emergency response actions or recommendations based upon the telematics data;
   generating, by the one or more servers, a confirmation request message including an indication of the one or more emergency response actions or recommendations;
   transmitting, from the one or more servers to a mobile device associated with a driver of the vehicle via the communication network, the confirmation request message; and
   receiving, at the one or more servers from the mobile device associated with the driver of the vehicle via the communication network, an indication of a driver response to the confirmation request message based upon a driver interaction with the mobile device, wherein the driver response indicates one or more of the following: confirmation of the one or more emergency response actions or recommendations, modification of the one or more emergency response actions or recommendations, or rejection of the one or more emergency response actions or recommendations.

2. The computer-implemented method of claim 1, wherein the telematics data is collected from one or more of a vehicle computer or the mobile device associated with the driver of the vehicle based upon one or more sensors of the vehicle computer or mobile device.

3. The computer-implemented method of claim 1, the method further comprising:
   generating, by the one or more servers, an emergency response message to one or more emergency responders based upon the received indication of the driver response; and
   transmitting, from the one or more servers to one or more computer devices associated with the one or more emergency responders via the communication network, the emergency response message to the one or more emergency responders.

4. The computer-implemented method of claim 3, further comprising:
   generating, by the one or more servers, a preliminary emergency response message indicating at least one of the one or more emergency response actions or recommendations; and
   transmitting, from the one or more servers to one or more computer devices associated with one or more emergency responders via the communication network, the preliminary emergency response message prior to receiving the indication of the driver response,
   wherein:
      the driver response indicates modification or rejection of the one or more emergency response actions or recommendations, and
      the emergency response message includes a modification or a cancellation of the at least one of the one or more emergency response actions or recommendations indicated by the preliminary emergency response.

5. The computer-implemented method of claim 3, wherein:
   the driver response indicates confirmation of the one or more emergency response actions or recommendations; and
   the emergency response message to one or more emergency responders includes a request to provide the one or more emergency response actions or recommendations.

6. The computer-implemented method of claim 1, the method further comprising analyzing, by the one or more servers, the telematics data to determine an indication of severity of the vehicle accident, wherein:
   the confirmation request message further includes the indication of severity of the vehicle accident; and
   the driver response further indicates one or more of the following: confirmation of the indication of severity, modification of the indication of severity, or rejection of the indication of severity.

7. The computer-implemented method of claim 1, wherein:
   the one or more emergency response actions or recommendations are determined based upon one or more indications of damage to the vehicle or injuries to persons involved in the vehicle accident.

8. The computer-implemented method of claim 1, wherein the one or more emergency response actions or recommendations are determined based upon a user-customized profile indicating preferences of the driver.

9. The computer-implemented method of claim 1, further comprising:
   identifying, by the one or more servers, an insurance policy associated with the vehicle accident, wherein the insurance policy is associated with the vehicle or with the driver; and
   determining, by the one or more servers, a type of a claim associated with the insurance policy relating to the vehicle accident based upon an indication of severity of the vehicle accident determined from the telematics data.

10. The computer-implemented method of claim 9, wherein the claim is determined to be a minor type of claim, and further comprising:
 causing, by a message to the mobile device from the one or more servers, the mobile device to present one or more options to the driver, the one or more options facilitating submission of a self-service report associated with the claim by the driver.

11. The computer-implemented method of claim 10, further comprising:
 determining, by the one or more servers, an adjustment or update to an insurance policy associated with the driver based upon the self-service report; and
 causing, by the one or more servers, the adjustment or update to the insurance policy to be implemented.

12. A computer system for responding to vehicle accidents, the system comprising:
 one or more processors; and
 one or more non-transitory memories coupled to the one or more processors and storing executable instructions that, when executed by the one or more processors, cause the computer system to:
 collect telematics data associated with a vehicle at a time of a vehicle accident via a communication network;
 determine one or more emergency response actions or recommendations based upon the telematics data;
 generate a confirmation request message including an indication of the one or more emergency response actions or recommendations;
 transmit the confirmation request message to a mobile device associated with a driver of the vehicle via the communication network; and
 receive an indication of a driver response to the confirmation request message from the mobile device associated with the driver of the vehicle via the communication network, wherein the driver response is based upon a driver interaction with the mobile device and indicates one or more of the following: confirmation of the one or more emergency response actions or recommendations, modification of the one or more emergency response actions or recommendations, or rejection of the one or more emergency response actions or recommendations.

13. The computer system of claim 12, wherein the telematics data is collected from one or more of a vehicle computer or the mobile device associated with the driver of the vehicle based upon one or more sensors of the vehicle computer or mobile device.

14. The computer system of claim 12, wherein the executable instructions that cause the computer system to determine the one or more emergency response actions or recommendations further cause the computer system to:
 access a user-customized profile indicating preferences of the driver; and
 determine the one or more emergency response actions or recommendations based at least in part upon the preferences indicated by the user-customized profile.

15. The computer system of claim 12, wherein the executable instructions further cause the computer system to:
 identify an insurance policy associated with the vehicle accident, wherein the insurance policy is associated with the vehicle or with the driver;
 determine a claim associated with the insurance policy relating to the vehicle accident is a minor type of claim based upon an indication of severity of the vehicle accident determined from the telematics data;
 cause the mobile device to present one or more options to the driver, the one or more options facilitating submission of a self-service report associated with the claim by the driver;
 receive the self-service report associated with the claim from the mobile device;
 determine an adjustment or update to an insurance policy associated with the driver based upon the self-service report; and
 cause the adjustment or update to the insurance policy to be implemented.

16. A tangible, non-transitory computer-readable medium storing executable instructions for responding to vehicle accidents that, when executed by at least one processor of a computer system, cause the computer system to:
 collect telematics data associated with a vehicle at a time of a vehicle accident via a communication network;
 determine one or more emergency response actions or recommendations based upon the telematics data;
 generate a confirmation request message including an indication of the one or more emergency response actions or recommendations;
 transmit the confirmation request message to a mobile device associated with a driver of the vehicle via the communication network; and
 receive an indication of a driver response to the confirmation request from the mobile device associated with the driver of the vehicle via the communication network, wherein the driver response is based upon a driver interaction with the mobile device and indicates one or more of the following: confirmation of the one or more emergency response actions or recommendations, modification of the one or more emergency response actions or recommendations, or rejection of the one or more emergency response actions or recommendations.

17. The tangible, non-transitory computer-readable medium of claim 16, wherein the telematics data is collected from one or more of a vehicle computer or the mobile device associated with the driver of the vehicle based upon one or more sensors of the vehicle computer or mobile device.

18. The tangible, non-transitory computer-readable medium of claim 16, wherein: an indication of severity of the vehicle accident is generated that includes one or more indications of damage to the vehicle or injuries to persons involved in the vehicle accident; and
 the executable instructions that cause the computer system to determine the one or more emergency response actions or recommendations further cause the computer system to determine the one or more emergency response actions or recommendations based upon the one or more indications of damage to the vehicle or injuries to persons involved in the vehicle accident.

19. The tangible, non-transitory computer-readable medium of claim 16, wherein the executable instructions that cause the computer system to determine the one or more emergency response actions or recommendations further cause the computer system to:
 access a user-customized profile indicating preferences of the driver; and
 determine the one or more emergency response actions or recommendations based at least in part upon the preferences indicated by the user-customized profile.

20. The tangible, non-transitory computer-readable medium of claim 16, wherein the executable instructions further cause the computer system to:

identify an insurance policy associated with the vehicle accident, wherein the insurance policy is associated with the vehicle or with the driver;

determine a claim associated with the insurance policy relating to the vehicle accident is a minor type of claim based upon an indication of severity of the vehicle accident;

cause the mobile device to present one or more options to the driver, the one or more options facilitating submission of a self-service report associated with the claim by the driver;

receive the self-service report associated with the claim from the mobile device;

determine an adjustment or update to an insurance policy associated with the driver based upon the self-service report; and cause the adjustment or update to the insurance policy to be implemented.

\* \* \* \* \*